United States Patent
Tang et al.

(10) Patent No.: US 10,146,878 B2
(45) Date of Patent: Dec. 4, 2018

(54) METHOD AND SYSTEM FOR CREATING FILTERS FOR SOCIAL DATA TOPIC CREATION

(71) Applicant: ORACLE INTERNATIONAL CORPORATION, Redwood Shores, CA (US)

(72) Inventors: Glenn Tang, Austin, TX (US); Mehrshad Setayesh, Lafayette, CO (US); Timothy P. McCandless, Boulder, CO (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 400 days.

(21) Appl. No.: 14/863,690

(22) Filed: Sep. 24, 2015

(65) Prior Publication Data
US 2016/0092551 A1    Mar. 31, 2016

Related U.S. Application Data

(60) Provisional application No. 62/056,118, filed on Sep. 26, 2014.

(51) Int. Cl.
*G06F 17/30* (2006.01)
*H04L 12/58* (2006.01)

(52) U.S. Cl.
CPC .. *G06F 17/30867* (2013.01); *G06F 17/30616* (2013.01); *H04L 51/32* (2013.01); *G06F 17/30707* (2013.01)

(58) Field of Classification Search
CPC ......... G06F 17/30867; G06F 17/30707; G06F 17/30648; G06F 17/30705; H04L 51/32
See application file for complete search history.

(56) References Cited

U.S. PATENT DOCUMENTS

| 7,383,172 | B1 | 6/2008 | Jamieson |
| 8,090,724 | B1 | 1/2012 | Welch |
| 8,200,761 | B1 * | 6/2012 | Tevanian ................ H04L 51/12 709/206 |
| 8,245,135 | B2 | 8/2012 | Cai |
| 8,255,572 | B1 * | 8/2012 | Coomer ............... G06Q 10/107 709/206 |
| 8,438,124 | B2 * | 5/2013 | Spivack ................ G06Q 30/02 706/45 |
| 8,630,975 | B1 * | 1/2014 | Guo ...................... G06N 7/005 707/608 |

(Continued)

OTHER PUBLICATIONS

Final Office Action dated May 20, 2016 for related U.S. Appl. No. 14/527,697.

(Continued)

*Primary Examiner* — Merilyn Nguyen
(74) *Attorney, Agent, or Firm* — Invoke

(57) ABSTRACT

Disclosed is a system, method, and computer program product for performing semantic analysis and creating topics with regards to social data. A user interface is provided that allows the user to view and interact with to view and control the process/mechanism or creating topics. The user interface allows the user to create one or more text-based filters and metadata filters based on which social data for each topic is filtered.

24 Claims, 16 Drawing Sheets

(56) References Cited

U.S. PATENT DOCUMENTS

| | | | |
|---|---|---|---|
| 8,676,565 B2* | 3/2014 | Larcheveque | G06F 17/2785 704/1 |
| 8,694,304 B2* | 4/2014 | Larcheveque | G06F 17/2785 704/1 |
| 8,738,721 B1* | 5/2014 | Smirnov | G06Q 10/107 709/206 |
| 9,276,974 B2* | 3/2016 | Sommer | G06F 17/30864 |
| 9,336,192 B1* | 5/2016 | Barba | G06F 17/277 |
| 9,378,202 B2* | 6/2016 | Larcheveque | G06F 17/2785 |
| 9,727,925 B2* | 8/2017 | Subramanian | G06Q 50/01 |
| 2003/0009526 A1* | 1/2003 | Bellegarda | G06Q 10/107 709/206 |
| 2003/0061200 A1 | 3/2003 | Hubert | |
| 2004/0162827 A1 | 8/2004 | Nakano | |
| 2004/0205448 A1 | 10/2004 | Grefenstette | |
| 2004/0225667 A1 | 11/2004 | Hu | |
| 2005/0108001 A1 | 5/2005 | Aarskog | |
| 2007/0067157 A1 | 3/2007 | Kaku | |
| 2009/0013052 A1* | 1/2009 | Robarts | G06F 17/30867 709/206 |
| 2009/0112892 A1 | 4/2009 | Cardie | |
| 2011/0196670 A1 | 8/2011 | Dang | |
| 2011/0219107 A1* | 9/2011 | Betros | G06F 9/485 709/223 |
| 2013/0041962 A1* | 2/2013 | Wang | H04L 51/12 709/206 |
| 2013/0086072 A1* | 4/2013 | Peng | G06F 17/3087 707/743 |
| 2013/0262442 A1 | 10/2013 | Dennis | |
| 2014/0074551 A1 | 3/2014 | Setayesh et al. | |
| 2015/0089409 A1 | 3/2015 | Asseily | |
| 2015/0120302 A1 | 4/2015 | Mccandless et al. | |
| 2015/0149448 A1 | 5/2015 | Mccandless et al. | |
| 2015/0149463 A1 | 5/2015 | Mccandless et al. | |
| 2016/0034445 A1 | 2/2016 | Setayesh et al. | |
| 2016/0034560 A1 | 2/2016 | Setayesh et al. | |
| 2016/0034571 A1 | 2/2016 | Setayesh et al. | |

OTHER PUBLICATIONS

Non-final Office Action dated Dec. 3, 2015 for related U.S. Appl. No. 14/527,697.

Notice of Allowance and Fee(s) Due dated Oct. 12, 2016 for related U.S. Appl. No. 14/527,697.

\* cited by examiner

METHOD AND SYSTEM FOR CREATING FILTERS FOR SOCIAL DATA TOPIC CREATION

CROSS-REFERENCE TO RELATED APPLICATION(S)

This application claims priority to U.S. Provisional Patent Application Ser. No. 62/056,118, filed on Sep. 26, 2014 entitled "METHOD AND SYSTEM FOR CREATING FILTERS FOR SOCIAL DATA TOPIC CREATION.". This application is cross-related to U.S. patent application Ser. No. 14/555,042 filed on Nov. 26, 2014, entitled "METHOD AND SYSTEM FOR PERFORMING TOPIC CREATION FOR SOCIAL DATA." The content of the aforementioned patent applications are hereby expressly incorporated by reference in their entirety.

BACKGROUND

Given the widespread availability and usage of the Internet by consumers, many organizations (e.g., an enterprise, a small business, a government agency, etc.) have become interested in being able to effectively monitor the content and commentary provided by such consumers. Interactive websites such as social networks and blogs provide a wealth of useful information that can be advantageously used by a business.

It is possible to monitor the content of social media sites to identify a range of topics that are of interest to various users of these sites. By knowing about and understanding these topics, the entity can then act upon that information to increase sales/revenue and/or visibility. It would be very desirable to allow the businesses to stay informed of actionable social networking content, for example, to identify potential customers and possible sales leads or to identify problematic situations that may require immediate involvement of customer service personnel.

For example, consider a CRM (Customer Relationship Management) application, which is designed to facilitate the ability of a business to create, develop, and build relationships with its customers or potential customers. It might be valuable for customers of the CRM application to understand a nature of conversation in social media networks, for example, to identify potential customers and possible sales leads.

As another example, brand managers of various entities are often interested in monitoring commentary on the internet regarding respective brands and/or competitors' brands. Brand managers may read the commentary to gauge interest in their marketing materials, receive feedback regarding their products, and/or take further action regarding any postings that warrant some type of follow-up response.

Current approaches for monitoring social media content are inefficient and require the brand manager or administrator of the entity to sift through a plurality of social media content in order to arrive at messages of particular interest. This is extremely time consuming and inefficient, and often doesn't provide an accurate data that is of particular interest to the entity.

Therefore, there is a need for an improved approach to process and filter communications related to an organization based of specific needs of the organization. Other additional objects, features, and advantages of the invention are described in the detailed description, figures, and claims.

SUMMARY

The present disclosure is directed to an approach for integrating one or more enterprise applications with a social networking application. Embodiments of the present invention provide a system, method, and computer program product for allowing an entity to access social media data, and to perform analysis upon that data to identify and create topics with regards to that data. In one aspect, a method comprises receiving a message associated with a social media communication, wherein the message comprises at least one metadata field and at least one content field, retrieving a set of metadata filters and text-based filters for a plurality of topics, wherein a metadata filter of the set of metadata filters defines criteria that must be satisfied within the at least one metadata field in a metadata structure of the message, and wherein a text-based filters of the set of text-based filters defines criteria that must be satisfied within the at least one content field in a content structure of the set of messages, analyzing the message against the retrieved metadata and text-based filters, wherein the metadata structure of the message is analyzed against the metadata filters, and wherein the content structure of the message is analyzed against the text-based filters, annotating the message with one or more identifiers associated with a topic based at least in part on whether the metadata filters and text-based filters for the topic are satisfied, and categorizing the message for the topic based at least in part on both whether the message comprises an annotation corresponding to the metadata filters associated with the topic, and whether the message comprises an annotation corresponding to the text-based filters associated with the topic.

Other and additional objects, features, and advantages of the invention are described in the detailed description, figures, and claims.

DETAILED DESCRIPTION

Figure 1:
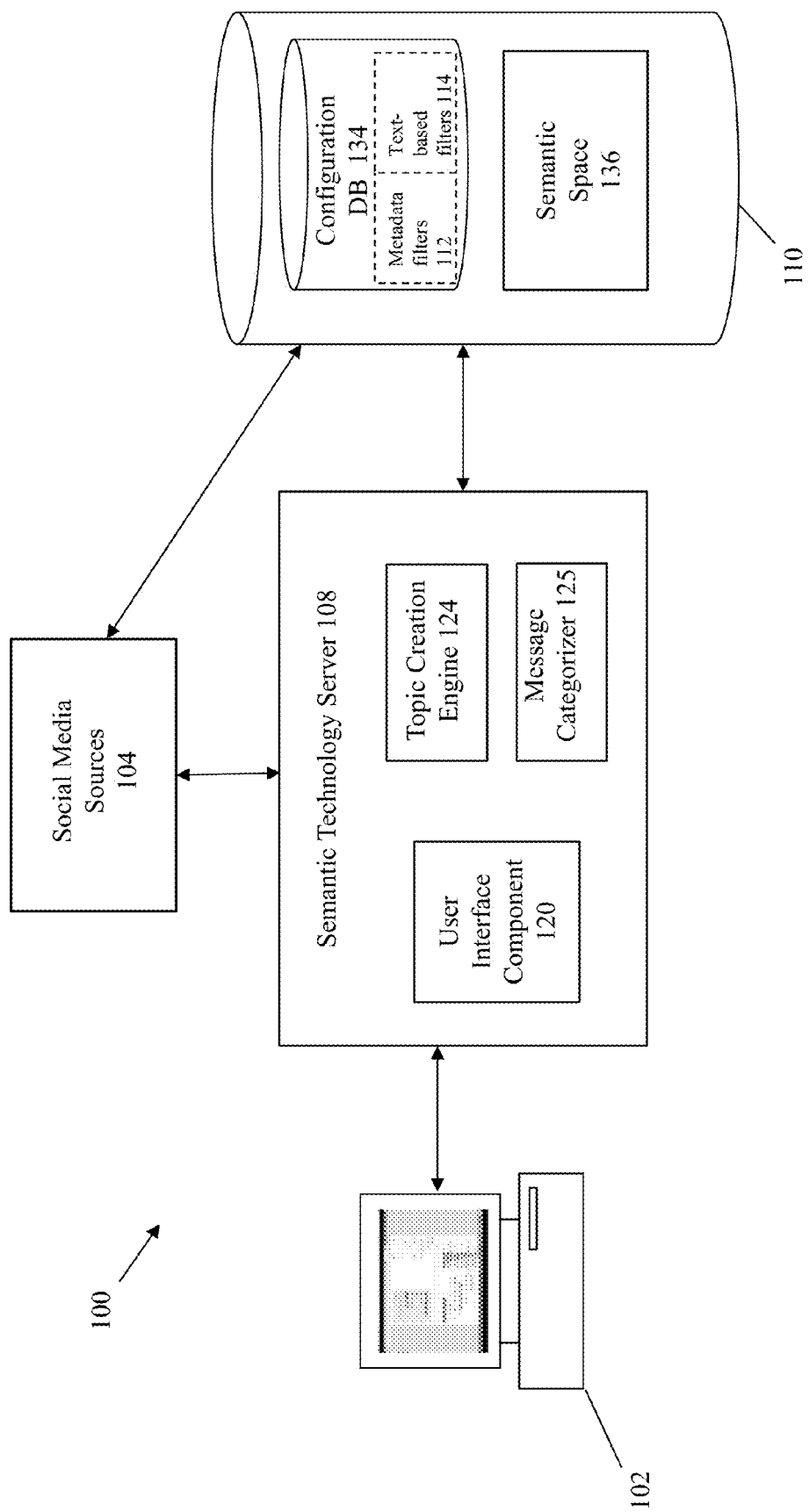
FIG. 1 illustrates an example system which may be employed in some embodiments of the invention.

Embodiments of the present invention(s) provide a system, method, and computer program product for defining filters in a topic creation mechanism that allows an entity to create topics of interest for semantic analysis. This type of filtering can be used to perform more detailed analysis on a particular type of social data, and to provide context in understanding the significance of data retrieved from various sources.

To explain, consider if it is desired to perform semantic analysis upon data from one or more social media sites to identify topics of interest within that data. The analysis may be performed for any suitable purpose. For example, consider the situation where a marketer wishes to identify social media content pertaining to a given subject matter. Given the wide range of terms, terminology and word usage choices by users of social media systems, it is often very difficult for conventional technologies to automate the process of specifically identifying and narrowing the subject matter that is actually being addressed by any given social media message or posting.

To address this and other problems, the present invention provides a mechanism for allowing "topics" to be created with a set of filters, which provides an approach to better capture the scope of a given set of subject matter. For example, when creating a topic, the user may want to specify one or more filters to identify context and provide scope to the topic. The filters may be text-based filters or metadata filters. Text-based filters refer to words or terms that define a scope of the topic. In other words, text-based filters are applied on a content structure of the social media message itself.

Metadata filters, on the other hand, filter social media data, not on the content of the social media message, but rather one or more metadata properties or a metadata structure of the social media message. Metadata may refer to "data about data." Metadata may refer to a set of information that is packaged along with a data packet, that provides details on the data packet itself. For example, a social media message may be entered by a user. The text of the post itself may be considered the content of the social media message, but there are also metadata properties that may be associated with the social media message. For example, details about the social media account, date and time of the post, name of the user's account, etc. may be stored in a metadata structure of the data packet.

The main purpose of metadata may be to facilitate in the identification of relevant information (also known as resource discovery). Metadata may also help organize electronic resources, provide digital identification, and may help support archiving and preservation of the resource. More specifically, metadata makes it easier in identifying resources, finding similarities in various resources, providing more information about the resource, etc. Rather than going through the actual content of the resource (e.g., message, web page, document, etc.), documents may be easily organized simply using the metadata. The metadata structure is typically appended to the content structure of a message and comprises a set of essential information about the message or resource. Typically, metadata structures occupy less storage space, and are typically considered an efficient way of gathering information about the resource, especially for searching and/or organization purposes. Here, it may be easier to search and/or eliminate resources using the metadata filter, such that resources or messages may be easily discarded if they do not adhere to requirements specified through the metadata filters. Further information on how metadata filters are defined will be described throughout the current application.

A social media message may be a message received from a social media server that hosts social media content. The social media server may be a website that allows users of the social media website to interact with each other. The social media website may be a public website or a private website. The social media website may have authorization credentials that allow members to interact with the social media website and with others users.

Each message coming from a data source may be associated with one or more metadata fields and one or more content fields. Each resource may be associated with a content structure having a set of content fields as well as a metadata structure having a set of metadata fields. In one or more embodiments, the metadata structure is assembled according to standardized concepts using a well-defined metadata scheme. This may include metadata standard and/or metadata models. Many tools, including controlled metadata vocabularies, taxonomies, thesauri, etc. may be used to apply standardization to the metadata.

In one or more embodiments, the metadata structure may be a data template having a set of metadata fields. These fields may store various types of data. In one or more embodiments, metadata schema may be hierarchical in nature, and may comprise many levels of granularity. Granularity may refer to a degree to which the data or metadata is structured. Metadata structures with high granularity allow for deeper structured information and enable greater levels of technical manipulation. A lower level of granularity may be created more easily, but may not provided detailed information.

The content structure typically comprises a set of content fields. The content field(s) of the content structure may comprise the message itself. The metadata fields of the metadata structure may store a set of data about the message. One metadata field may store a data and time associated with the creation of the message. Another metadata field may store an author of the message. Another metadata field may store an originating location of the message. Yet another metadata field may store information about a type of message.

In other words, the metadata structure may comprise one or more details about the message in the various metadata fields (e.g., name, date, time, recipient, IP address, location, URL, author, destination, type, etc.). It should be appreciated that any or all of the above identified details may be stored in the metadata structure. Other metadata structures may store other information not explicitly described above, and the list above should not be read as limiting. The content structure typically comprises the post itself, and comprises the actual text of the message.

The metadata filter may be a defined query that is configured to search through a metadata structure of a resource. More specifically, the metadata filter may identify a metadata structure of the resource, and run the search query on the metadata structure only. The metadata filter may refer to metadata criteria defined by a user or system administrator.

The metadata filter may be used to include or exclude social media messages having particular metadata parameters. The type of metadata filters used may be, for example, a geographic location filter (i.e., filtering social data to only include social data originating from one or more desired geographical locations, filtering data to exclude social data originating from one or more geographical locations, etc.), a URL filter (i.e., filtering social data to only include social data originating from one or more source URLs, filtering data to exclude social data origination from one or more source URLs, etc.), an author filter (i.e., following a particular author, excluding social data by a particular author, etc.). Allowing the user to apply one or more filters to the social data enables the user to tailor the search results based on what is of interest to him and her, and therefore allows the user to better control and understand the social data. Although the following paragraphs describe various embodiments of the invention in the context of social data, it should be appreciated that the present invention may extend to any type of structured or unstructured data.

FIG. 1 illustrates an example semantic analysis system 100 which may be employed in some embodiments of the invention to implement topic creation for semantic analysis. The system includes one or more users at one or more user stations 102 that operate the system. The user station 102 comprises any type of computing station that may be used to operate or interface with the applications in the system. Examples of such user stations 102 include, for example, workstations, personal computers, or remote computing terminals. The user station 102 comprises a display device, such as a display monitor, for displaying a user interface to users at the user station. The user station 102 also comprises one or more input devices for the user to provide operational control over the activities of the system 100, such as a touch screen or mouse or keyboard to manipulate a pointing object in a graphical user interface to generate user inputs. The user station 102 may receive various inputs from the user when creating topics of interest for semantic analysis. The user may define text-based or metadata filters through the user station 102.

The semantic analysis system 100 may refer to a system that performs semantic analysis on a set of data associated with one or more entities or organizations. Semantic analysis is especially helpful in determining an underlying meaning and/or a context of terms used in language. Semantic analysis may refer to determining a semantic significance of words in the received set of data relative to the many other possible semantic dimensions of the words. Semantic significance may refer to a known meaning or context of a term. A term may have many meanings or semantic significances. Semantic analysis allows data to be parsed in a manner that is cognizant of one intended semantic significance of one or more terms while disregarding data that is unrelated to the intended semantic significance. Thus, the goal of semantic analysis is that the analyzed data will then be more relevant to the user, because the data corresponds to an underlying context or meaning desired by the user, while disregarding data that is unrelated to the meaning desired by the user even if it contains the same terms.

For example, a word may have many meanings or semantic significances associated with it. The same word may have various connotations, sometimes ones that are diametrically opposite to each other. These various meanings or dimensions may be represented mathematically by vectors, as will be described in further detail below. Consider a simple word, "bark." In one context, the word "bark" may be the verb that refers to a sound produced by dogs. In another context, the word "bark" may refer to a curt or angry response by a person. In yet another context, the word "bark" may refer to the outside covering of a tree. Thus, a single word may have multiple semantic significances. The goal of the semantic analysis system is to determine the semantic significance that most closely aligns with the semantic significance that is of interest to an entity.

Themes may be identified, for example, by performing semantic analysis and identifying semantic clusters within the analyzed data. The semantic clusters correspond to one or more themes within the data. For example, latent semantic analysis (LSA), an advanced form of statistical language modeling, can be used to perform semantic analysis upon the content. This permits the system to understand the contextual and semantic significance of terms that appear within the data. For example, semantic analysis can be used to understand the difference between the term "Galaxy" used in the astronomy context, and "Galaxy" that is used to refer to the name of a professional soccer team.

To this end, and as will be described in greater detail below, the many semantic significances of one or more terms are represented as mathematical vectors. In the above example, the word bark, as in bark of a dog may be assigned a first semantic significance through a first mathematical vector (e.g., having a magnitude and direction), and the word bark, as in tree bark may be assigned another semantic significance through a second mathematical vector (e.g., having another magnitude and direction). In this way, mathematical vectors are assigned to a large bank of terms in a particular language (and the similar process is repeated for other languages), and stored for reference in order to determine the semantic significance of terms in received data.

In order to understand the semantic significance of words of interest to a particular entity, topics are created, in which a user associated with the entity defines the semantic significance of one or more terms of interest. In doing so, the user is essentially selecting one or more mathematical vectors over other mathematical vectors associated with a term (e.g., choosing "bark" as in tree bark, over "dog bark"). Topics can be created, which provides an approach to capture the scope of a given set of subject matter. The topic definitions can then be used, for example, to automatically classify data, e.g., by determining whether a given message/post falls within the topic definition. Based at least in part upon performing semantic analysis, themes may be identified within the data.

In order to perform semantic analysis on the data received from the entity, the mathematical vectors of terms in the received data are compared to mathematical vectors associated with created topics, in order to semantically categorize the data based on topics or terms that are of specific interest to the user.

A semantic technology server 108 receives data from one or more data sources 104. In one or more embodiments, the data may be associated with an enterprise, entity, organization or individual. In one or more embodiments, an entity may refer to a business. The business may be an enterprise or business organization that is engaged in an activity (e.g., selling of goods or services, etc.) for profit. The enterprise may be a large business organization (e.g., having more than 1000 employees, etc.) The enterprise may refer to any undertaking by an individual or group of individuals for profit. In one or more embodiments, the enterprise may be a business unit or firm (e.g., law firm). The enterprise may be a corporation, in one or more embodiments. In one or more embodiments, the entity may refer to a small business (e.g., having less than 1000 employees). The enterprise may deal with goods or services in any area (e.g., software, pharmaceuticals, engineering, manufacturing, etc.)

In other embodiments, the entity may refer to a non-profit organization. The non-profit organization may be an organization that uses surplus revenues to achieve a purpose or mission rather than using the revenues for profit. The entity may refer to any type of non-profit organization having any number of employees. In other embodiments, entity may refer to a government agency. The government agency may be a local governmental agency, a state government agency, a federal agency or even some international government agency. The government agency may provide may be a permanent or semi-permanent organization in a government that is responsible for oversight and administration of specific functions. The government agency may have any number of employees.

The entity may refer generally to any organization comprise a plurality of people, such as an institution that has a collective goal. In one or more embodiments, the entity may be an individual (e.g., a solo business owner, etc.). In one or more embodiments, an entity is a customer or tenant of a system that serves one or more tenants or one or more customers and offers services to employees or user accounts for the customer or tenant.

The data may be collected through a plurality of data sources. Such data sources 104 include, for example, enterprise data comprising private communications from within a business.

In one or more embodiments, enterprise private data refers to data corresponding to communications within a business. The enterprise private data may be associated with messages and responses from one or more employees, for example. For example, an enterprise call center may produce many messages private to an organization that needs to be processed. Or, in another example, enterprise data may refer to data collected from an enterprise social media system. Or, in another example, enterprise data may refer to data collected from social networks that the entity has one or more accounts in. In one or more embodiments, enterprise data may be any data owned by the enterprise. It should be appreciated that public data may be similarly used, in one or more embodiments.

Enterprise community data may also be provided to the system from hosted customer communities, such as for example, data from Jive or Lithium. The data sources 104 may also include public data sources, such as social media sources, a social network, blog or web feed (e.g., Facebook, Twitter, Blogger, and RSS). The content may include one or more comments (e.g., Facebook comment, comment to a blog post, reply to a previous comment) or uploaded postings (e.g., images and associated metadata, text, rich media, URLs) at one or more sources. The social data/content may therefore comprise a variety of forms and/or types. It is noted that while the currently described embodiment describes analysis of these specific types of data, the inventive concepts are applicable to analysis of other types of content as well.

In some embodiments, the semantic technology server 108 comprises a topic creation engine 124 to create topics with respect to the social media data. The topic creation engine 124 processes the social data using semantic analysis to identify themes within the data. The identified themes are used to categorize data to their associated topic definitions. In operation, the topic creation engine 124 may access a semantic space 136 to perform the themes analysis, as described in more detail below. The topics definitions created using the topic creation engine 124 may be stored in a configuration database 134.

As shown in FIG. 1, one or more parameters or filters set for a topic may be stored in the configuration database 134. The configuration database 134 may store text-based filters 114 or metadata filters 112. These filters may be defined by the user during the topic creation process. For example, the user may define a set terms based on which to perform the semantic analysis. These may be considered text-based or semantic filters. For example, following the example from above, the term "bark" or the term "galaxy" may be considered a semantic filter. The filters may also refer to metadata filters based on which the social data is filtered. For example, the user may define a geographical location (e.g., San Francisco), such that only social data originating from the desired location is analyzed. The geographical location may be determined through an IP address associated with the message. In other embodiments, the geographical location may be determined through a GPS location associated with the message. In yet another embodiment, the geographical location may refer to a location that is set by the user or social media network.

In another embodiment, the user may define a particular URL of interest (e.g., www.twitter.com), such that only data from the desired URL is semantically analyzed. This may greatly reduce a scope of semantic analysis, and may have the effect of making the semantic analysis process faster and more efficient. In most cases, users of the semantic analysis system are concerned with a particular demographic. Using metadata filters allows users to hone in to specific topics of interest without unnecessarily receiving unrelated results.

The semantic technology server 108 also comprises a message categorizer 125. The message categorizer performs message categorization to analyze the content of the data from the data sources 104.

A user interface component 120 generates the content that is visually displayed to a user at user station 102. The user interface component 120 may also be used to retrieve user inputs through the user interface to control the operations of the topic creation engine 124.

The configuration database 134, semantic space 136, and/or analysis results can be stored in a computer readable storage device 110. The computer readable storage device 110 comprises any combination of hardware and software that allows for ready access to the data that is located at the computer readable storage device. For example, the computer readable storage device 110 could be implemented as computer memory operatively managed by an operating system. The computer readable storage device could also be implemented as an electronic database system having storage on persistent and/or non-persistent storage.

Any of the components/servers in the above-described system may include a bus or other communication mechanism for communicating information, which interconnects subsystems and devices, such as processor, system memory (e.g., RAM), static storage device (e.g., ROM), disk drive (e.g., magnetic or optical), communication interface (e.g., modem or Ethernet card), display (e.g., CRT or LCD), input device (e.g., keyboard, touchscreen). The system component performs specific operations by the processor executing one or more sequences of one or more instructions contained in system memory. Such instructions may be read into system memory from another computer readable/usable medium, such as static storage device or disk drive. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive. Volatile media includes dynamic memory, such as system memory. Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computing system. According to other embodiments of the invention, two or more computing systems coupled by a communication link (e.g., LAN, PTSN, or wireless network) may perform the sequence of instructions required to practice the invention in coordination with one another. The system component may transmit and receive messages, data, and instructions, including program, i.e., application code, through communication link and communication interface. Received program code may be executed by the processor as it is received, and/or stored in disk drive, or other non-volatile storage for later execution.

Figure 2:
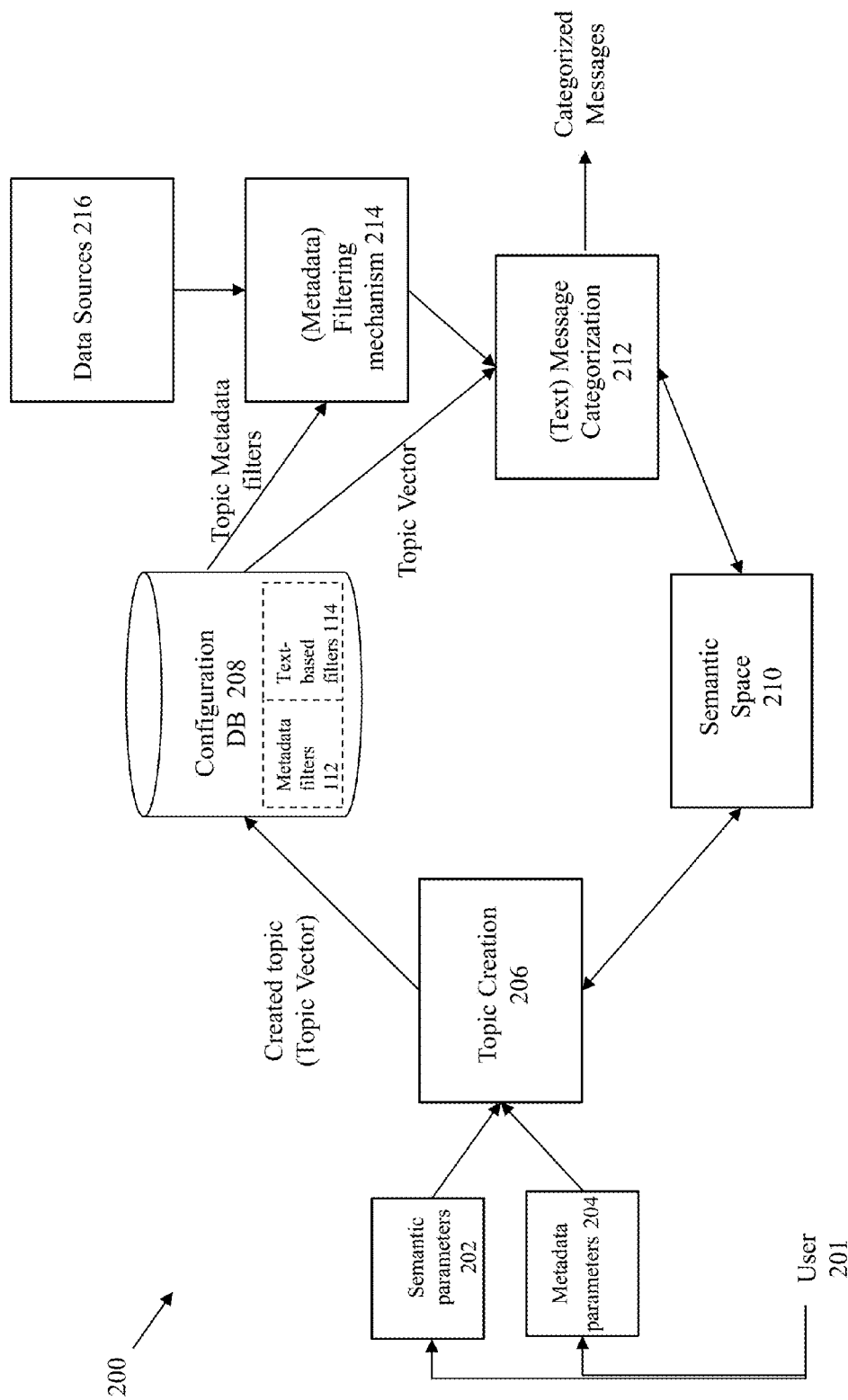
FIG. 2 illustrates an example system that allows creation of metadata filters and text-based filters according to some embodiments of the invention.

FIG. 2 illustrates an example system 200 that illustrates an overall working of the semantic analysis system using filters. A user of the system 201 defines a set of semantic parameters 202 (e.g., a search term, etc.) and metadata parameters 204 (e.g., a geographical location, a URL, an author, etc.) for one or more topics of interest. These parameters may be entered through a user interface component (not shown).

A topic creation mechanism 206 can be used to create a new topic (having the text-based and/or metadata filters), which is saved into the configuration database 208. It should be appreciated that the created topic is essentially a collection of text-based and metadata filters. At least one filter or parameter must be defined in order to create a topic. In some embodiments, at least one text-based filter must be created for a topic. In other embodiments, messages may be categorized simply based on metadata filters.

A message categorization mechanism 212 is configured to perform categorization of messages from data various data sources 216. As discussed above, data may be retrieved from a plurality of data sources for semantic analysis. In one or more embodiments, a filtering mechanism 214 may access the configuration database 208 to determine a set of metadata filters 112 for one or more topics, and filters the incoming data based at least in part on the set of metadata filters 112. For example, if a geographical filter has been set for a particular topic (e.g., San Francisco only, all countries except China, Spain and France only, etc.), the filtering mechanism 214 may filter the incoming data from the data sources 216 based on the defined metadata parameters.

It should be appreciated that most or all of the incoming data from the data sources 216 comprise content and metadata. The content refers to the message itself, whereas metadata refers to "data about data." The metadata may refer to structural metadata or descriptive metadata. In one or more embodiments, the metadata of the message may comprise some basic routing and networking information, including (but not limited to) name, IP address, destination, website information, URL, location, etc. The filtering mechanism 214 may consult one or more defined metadata filters 112 from the configuration database 208, and automatically filter out data that does not conform to the defined filters for a particular topic.

For example, if the metadata filter 112 is defined such that only data having a particular URL is included, the filtering mechanism 214 may filter out all the data except that having the particular included. Or, if the metadata filter 112 is defined such that only data from San Francisco is to be semantically analyzed, the filtering mechanism 214 may filter out all the data except that having a "San Francisco" tag in the metadata of the message. Or, in yet another example, if the metadata filter 112 is defined such that only data corresponding to a particular author (e.g., a Twitter® handle) is to be included, the filtering mechanism 214 may filter out all the data except that having the desired Twitter® handle. It should be appreciated that this generally greatly reduces the amount of data that needs to go through the semantic analysis process. The filtered data may be forwarded to the message categorization mechanism 212.

The message categorizer 212 may access the topic vectors (or semantic filters) for the created topics from the configuration database 208, and uses the topic vectors to identify topics within the filtered data (if the data is filtered). Of course, if no metadata filter was set for a topic, then the filtering mechanism does not filter out any data, and all the incoming data may go through the message categorizer 212. The message categorizer 212 may consult a semantic space 210 in order to vectorize the filtered data. The vectorized data may be compared to the topic vectors (semantic filters) in order to categorize the filtered data into various topics. The categorized messages are then sent further downstream. As will be described in further detail below, a topic vector is a mathematical representation of a semantic significance of one or more terms of interest to a user or entity. Further details on how topic vectors are created will be provided further below.

Figure 3:
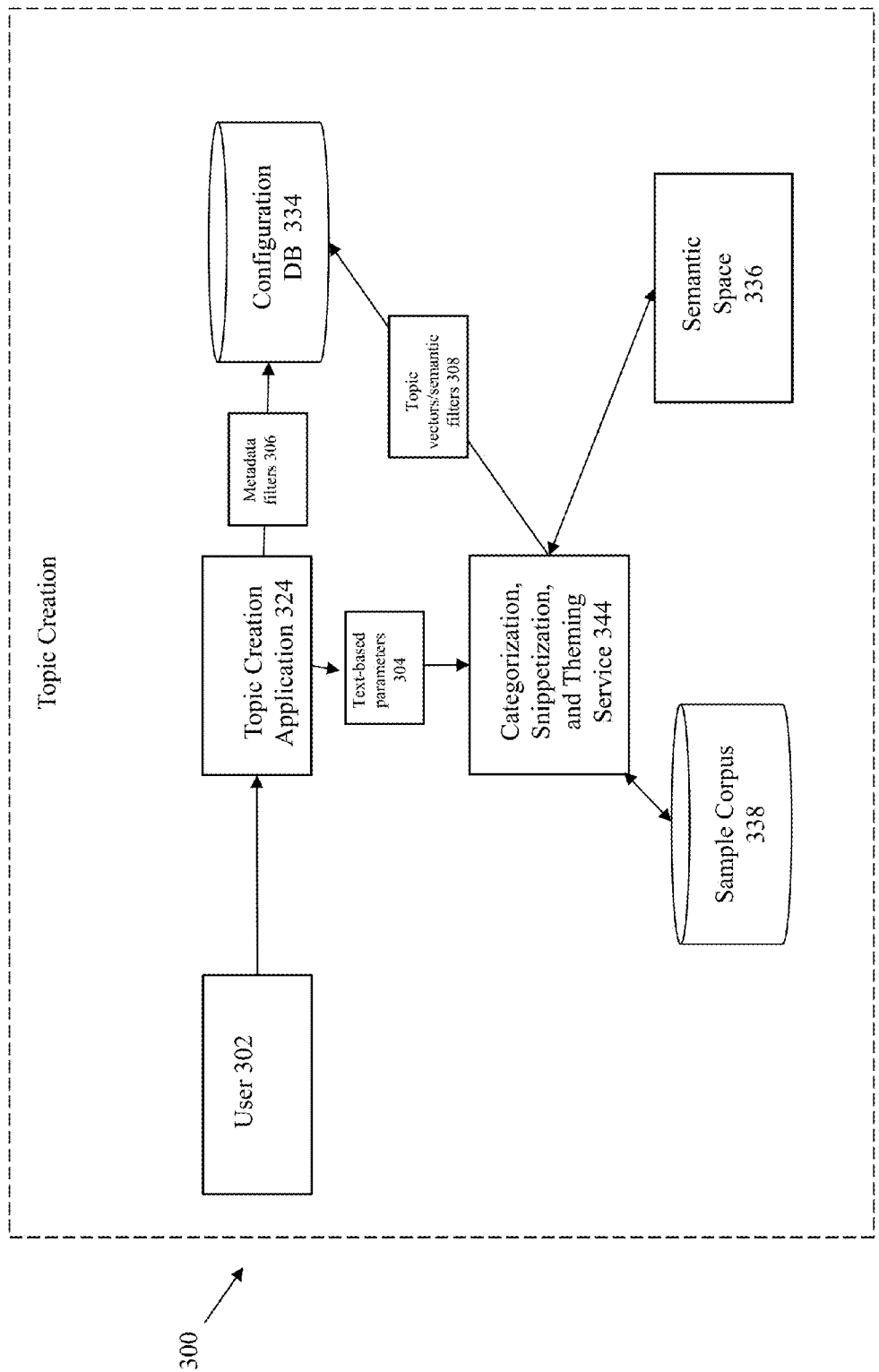
FIG. 3 illustrates an example architecture that can be used to perform topic creation according to some embodiments of the invention(s).

FIG. 3 illustrates an example architecture 300 that can be used to perform topic creation according to some embodiments of the invention(s). A topic creation mechanism/application 324 is used by a user 302 to create the new topic. As discussed above, the user 302 may enter terms to define the topics (e.g., semantic parameters) and/or define one or more metadata parameters. In one or more embodiments, the topic creation mechanism 324 converts the metadata parameters as metadata filters 306.

The topic creation mechanism/application 324 comprises any combination of hardware/software that is configured and/or programmed to perform the actions specified herein. The metadata filters 306 and the text-based filters 308 may be stored in the configuration database 334.

In one or more embodiments, the semantic parameters 304 may be sent to a categorization, snippetization, and theming service 344. The service 344 provides functionality to perform categorization of a given set of content using semantic analysis. The analysis may be provided over the full content of a data item, or may instead be applied to a "snippet" from the data comprising a more targeted subset of the data. Theme identification of the data may also be performed by service 344. While these functions are described in conjunction with a single service 344 in FIG. 3, it is noted that any number and/or combination of one or more components/services may be utilized in practice to accomplish the described functions.

The service 344 may access a sample corpus 338 to perform its functions. The sample corpus 338 comprises a collected set of data from which the desired analysis is to be performed. In some embodiments, the sample corpus 338 comprises a rolling three month window of collected data. In other embodiments, the sample corpus 338 may comprise sample data particular to each customer of the semantic analysis system. This may be important in order to capture the appropriate context and/or meaning of a topic as used by the customer organization. In other embodiments, a common sample corpus having a variety of data types may be used for a plurality of customers.

A semantic space 336 is accessed to perform semantic analysis upon data from the sample corpus 338. The semantic space 336 comprises a collection of vector values for a number of dimensions that are identifiable for terms within the data to be analyzed. These vector values are usable to understand the actual meaning of terms when used in different contexts. Mathematical computation and comparison of the term vectors allows one to determine the underlying meaning of various themes and documents. In one or more embodiments, a common semantic space may be used for a plurality of customers. In other embodiments, a dedicated semantic space may be employed for each customer. In other embodiments, especially for language identification or language-based semantic analysis, a different semantic space may be accessed based on a desired language. As shown in FIG. 3, semantic filters or topic vectors 308 are created through this process, and are stored in the configuration database 334. Other text-based filters (e.g., keyword, Boolean etc., may also be stored in the configuration database 334.

Figure 4:
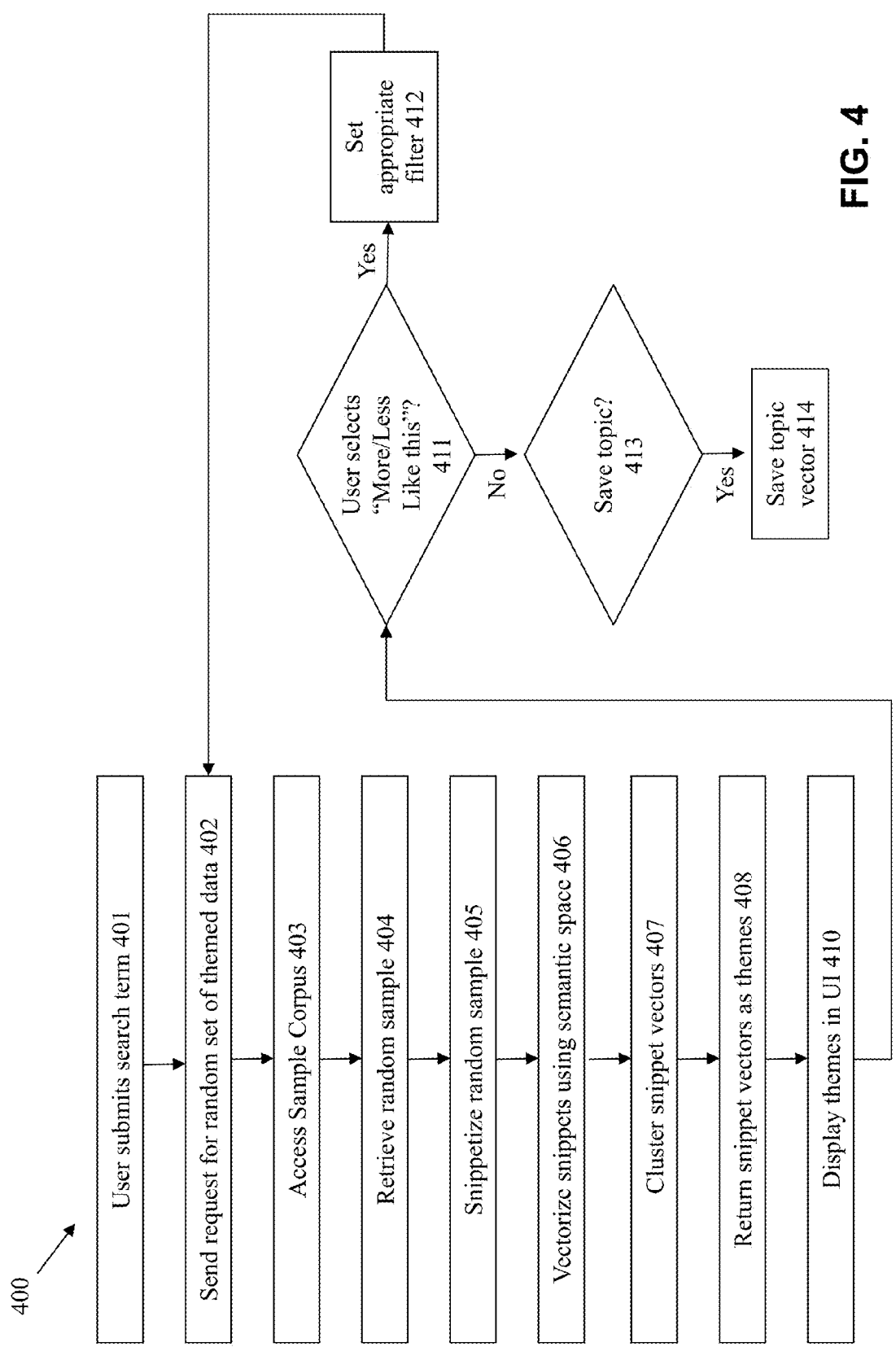
FIG. 4 shows a flowchart describing how the architecture of FIG. 3 is usable to perform topic creation.

FIG. 4 shows a flowchart 400 describing how the architecture of FIG. 3 is usable to perform topic creation. It should be appreciated that metadata filters (and text-based filters such as keyword, Boolean, etc.) may not go through this process, and may directly be stored in the configuration database, in some embodiments. At 401, the user submits an initial search term from the user interface to the topic creation mechanism/application 324.

Next, at 402, the topic creation mechanism/application 324 sends a request for a random set of themed messages to the service 344. The request is for a random set of the data. The general idea is that, instead of performing analysis upon the entirety of the data, the analysis can be performed for a selected sampling of the data. Assuming that the samples are properly extracted from the underlying content with adequate randomness, the sampled data should provide a reasonably representative sample of data for the analysis. For example, a sample size of 500-1000 can be retrieved in some embodiments to perform the sampling. In an alternative embodiment, sampling is not employed—this approach analyzes all of the underlying content.

At 403, the service 344 accesses the sample corpus 338 to obtain a random selection of messages using the initial search term. The selection may be performed by using the search term to perform a keyword/Boolean query against the data within the sample corpus 338.

At 404, a random sample of messages is returned to the service 344. Next, at 405, the random sample of messages is snippetized into "snippets". The snippet may not be the entirety of the message content. Instead, the snippet may only contain a given number of words on either side of the occurrence of the word/topic of interest ("anchor term") within the content. For example, if the search term of interest is "Galaxy", then snippets can be created that extend 200 words in either direction from any suitable occurrence of that word within the message content. Grammatical boundaries may also be used to define the extent of a snippet, e.g., by using sentence or paragraph boundaries to adjust the cut-off point for a snippet.

One reason for using snippets instead of the entire message content is because this approach may provide a much more accurate assessment of the meaning/context or a document. For example, consider if the search term is the term "Galaxy", where only a very small portion of the message actually pertains to that term. If a snippet is identified which is centered around that term, and only that snippet of the message is semantically analyzed, then it is likely that the semantic analysis will produce a relatively accurate semantic understanding for how that terms is used in the message. On the other hand, if the entirety of the message is semantically analyzed instead, and the vast majority of the message is focused on a different subject matter from that term "galaxy", then it is possible that the semantic meaning of how the term is used may be obscured by the overwhelming weight of the rest of the message which has no pertinence to that term.

At 406, the snippets that correspond to the random sample of messages are vectorized using the semantic space 336. The semantic vectors are created across a number of dimensions for the term vectors (e.g., across 300 dimensions). The semantic vectors are mathematical representations of the semantic significance of one or more terms of interest to a user. The vectorized topics are analyzed against the vectorized messages to determine whether they can be categorized for that topic, as will be discussed below.

The vectorization is performed for all of the words within the snippets. In other words, a vector is obtained for each word in the snippet. The vectors for a given snippet are averaged together to obtain a single, overall vector for the snippet. This provides a mathematical value for the context/meaning of that snippet.

At 407, snippets are clustered together, where vector comparisons are performed so that snippets having similar vectors are clustered together. Clustering may be performed, for example, by using the KMeans++ approach to clustering.

A given cluster of vectors corresponds to a single theme. Therefore, at 408, the clustered snippets are returned as themes. At 410, the themes are displayed to the user in a user interface. The user interface includes interface elements to permit the user to select one or more of the themes to create semantic filters and/or other text-based filters.

At 411, a determination is made whether the user has selected any of the themes for a new semantic filter. For example, a determination is made whether the user has selected a "More Like This" or "Less Like This" button for a given theme. If so, then at 412, a new semantic filter may be created. The actions starting from 402 may be repeated to obtain a new set of search results that accounts for the new semantic filter.

At 413, a determination is made whether the user desires to save the new topic. If so, then the topic vector (e.g., semantic filter) is saved at 414. In one or more embodiments, the average of the vector(s) of the selected themes forms the value that corresponds to a topic vector that is saved for the new topic. This topic vector may then be saved into the configuration database 334.

Figure 5A:
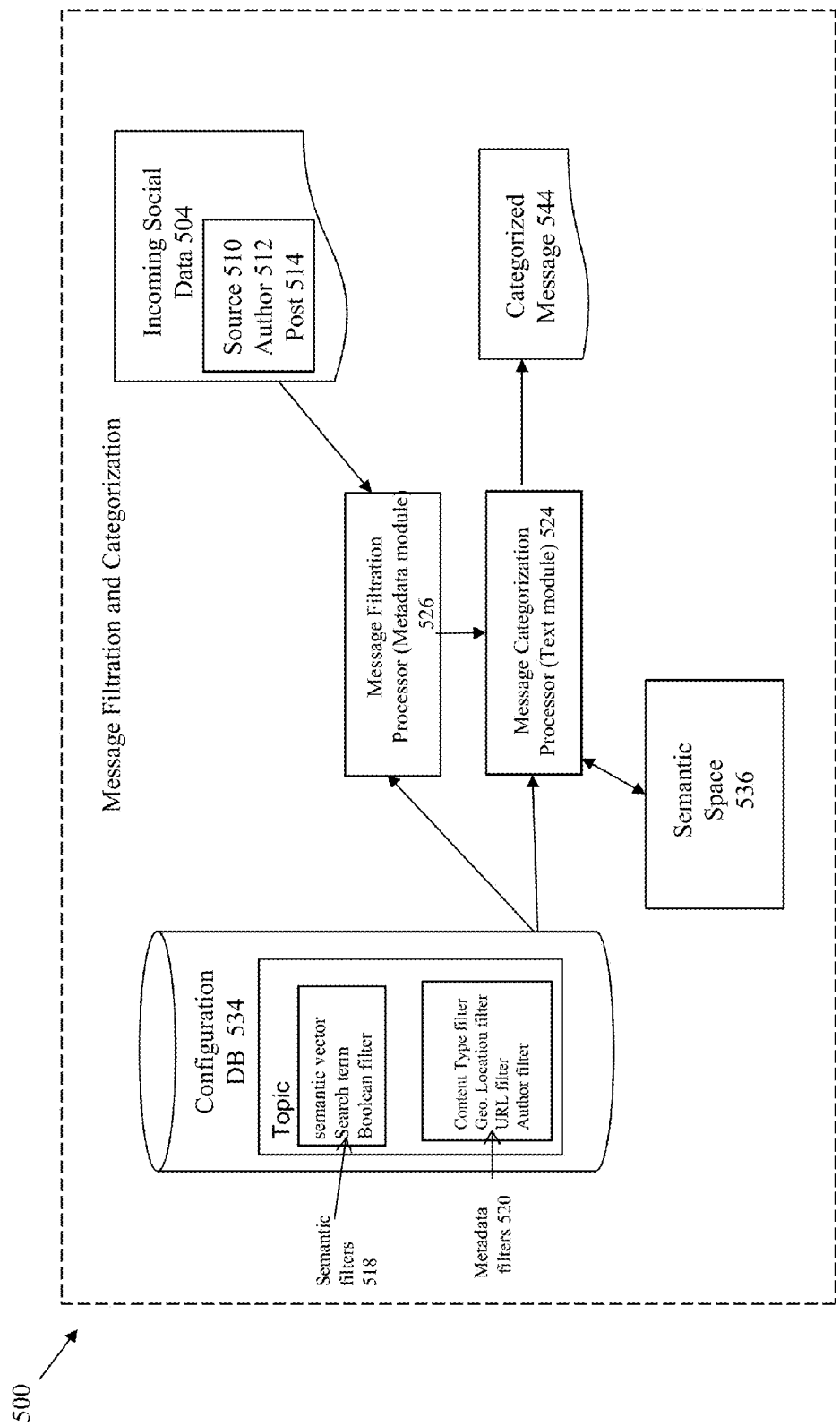
FIG. 5A illustrates an example embodiment for performing message categorization and filtration.

FIG. 5A illustrates an architecture of a system for performing message filtration and categorization. In one or more embodiments, a message filtration processor 526 receives incoming data from a plurality of data sources. In one or more embodiments, the message filtration processor 526 consults the configuration database 534 to retrieve a set of metadata filters 520. As shown in FIG. 5A, the configuration database 534 stores a set of details about a created topic. The topic may be associated with text-based filters 518 (e.g., search term, Boolean, the semantic filter, topic vector, etc.) and/or metadata filters 520 (e.g., a content type filter, a geographical location filter, a URL filter, an author filter, etc.).

The message filtration processor 526 retrieves the metadata filters from the configuration database 534 and filters the incoming data based on the metadata filters. Only data that fulfills the metadata defined criteria passes on to the message categorization processor 524.

Each incoming social media message may be thought of as having three levels: post 514, author 512, and source 510. The author 512 and the source 512 may be considered metadata, and the post 514 may be considered content. An author is a creator of a post that is posted on a particular social media source. The post of the social media message typically refers to the text of the post itself. The text-based filters (e.g., semantic vectors, Boolean search, keyword search, search term, etc.) are applied on the post itself. It should also be appreciated that they may be similarly applied to the author and source levels in other embodiments as well. The metadata filters (e.g., content type filters, URL based filters, geographical location filter and author filters) may be applied on the author and source level. For example, the author metadata filter may be used on the author level of the incoming social media message. Or, in another example, the URL based metadata filter may be applied on the Source level of the incoming social media message. The message categorization processor 524 also receives topic vectors from the configuration database 534.

In some embodiments, the message categorization processor 524 can be implemented as a pipeline processing mechanism, comprising a number of pipeline stages for processing of data. In one embodiment, the message categorization process 524 may have two separate modules; a text module and a metadata module (not shown). In such embodiments, the filtration is part of the message categorization process itself. For illustrative purposes, however, the following disclosure will focus on a message filtration processor that performs filtration based on metadata before forwarding the filtered messages to the message categorization processor 524. It should be appreciated, however, that other embodiments may perform metadata filtration and message categorization simultaneously. In other words, a metadata module may perform the filtration of data based on the metadata, and a text module may perform the other categorization steps.

One of the pipeline stages pertains to categorization of social media messages. Other pipeline stages can be employed to perform other functions, such as spam processing, deduplication, sentiment analysis, and term analysis.

For message categorization, the message categorization processor 524 utilizes the semantic space 536 to vectorize the social media content. A comparison is performed against the topic vectors to identify one or more topics that may be associated with the social media content. If any topics are identified, then the social content can be annotated and/or tagged to identify the topic. Thereafter, the categorized content 544 is released for downstream usage or storage, e.g., to be viewed using a dashboard tool or for routing to a downstream application such as a CRM (customer relations management), HR (human resources), or marketing application. In one or more embodiments, the categorized content may be forwarded to other downstream applications like business intelligence applications and/or analytic data warehouses.

In yet another embodiment, the message categorization for each topic may occur first, and the filtration step may occur after the messages have been categorized to various topics. The metadata filters may be applied to the categorized messages, thereby only including messages that satisfy all the metadata criteria set for the topic. It should be appreciated that either method may be used interchangeably to apply both text-based filters and metadata filters to the incoming social media data, and the example approach should not be seen as limiting.

Figure 6A:
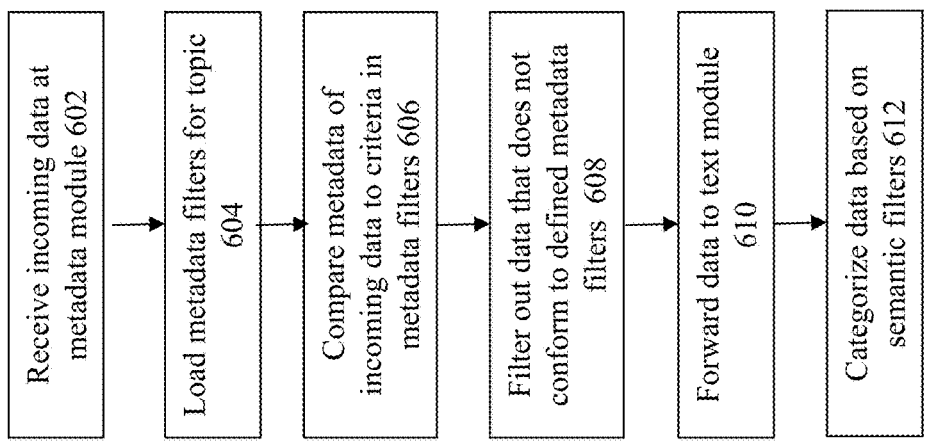
FIG. 6A illustrates a flowchart of an approach for performing message categorization and filtration using the architecture of FIG. 5A.

Referring ahead to FIG. 6A, FIG. 6A illustrates an example method of using both metadata filters and text-based filters to categorize the set of messages from various data sources based on the architecture of FIG. 5A. At 602, the filtration module (e.g., also referred to as the metadata module) may receive a set of incoming data from a set of data sources. At 604, the filtration module may retrieve a set of metadata filters for a particular topic from the configuration database. At 606, the metadata of the incoming messages are compared with the metadata criteria set for the particular topic. At 608, the data may be filtered based on whether the data satisfies the metadata criteria defined for the particular topic.

For example, data may be included or excluded based on a geographical location identified for the messages. The geographical location may be identified based on IP address, GPS locators, identified location as part of a user's profile, etc. In another example, data may be included or excluded based on a URL associated with the data. Particular URLs may be defined such that they are explicitly included or excluded. In another example, data may be included or excluded based on an author of the data. For example, only data originating from a particular Twitter® handle may be included or excluded, such that only that data is semantically analyzed by the message categorizer (or semantic module). In yet another example, data may be included or excluded based on a content type of the incoming message. For example, the user may only be interested in blogs, and not news websites. Or, the user may only be interested in social media websites. Or, the user may only be interested in websites associated with a particular media type (e.g., video, photos, etc.). Thus, filtration may be performed based on metadata of these messages. In one or more embodiments, the data may be annotated based on the loaded topic vectors. For example, if the message satisfies all the metadata parameters set for the data, the message may be annotated with an identifier associated with the topic. This annotated message may then go through the semantic analysis process.

In one or more embodiments, the annotation may identify one or more topics that are triggered by the given metadata filters and/or text-based filters for a message or group of messages. In one or more embodiments, the annotation may also identify whether the annotation was triggered based on the one or more metadata and/or text-based filters. In one or more embodiments, the annotation may also specify the topic(s) detected by the annotation. The annotation may comprise any or all type of data (e.g., identifiers, topics, connectors, related messages etc.) necessary to identify the annotated message for a particular topic.

At 610, the filtered messages may be forwarded to the message categorizer (or semantic module) for semantic analysis. At 612, the data is categorized based on text-based filters set for the particular topic. The semantically categorized may be stored in a database, and/or routed to endpoints associated with the various users.

Figure 5B:
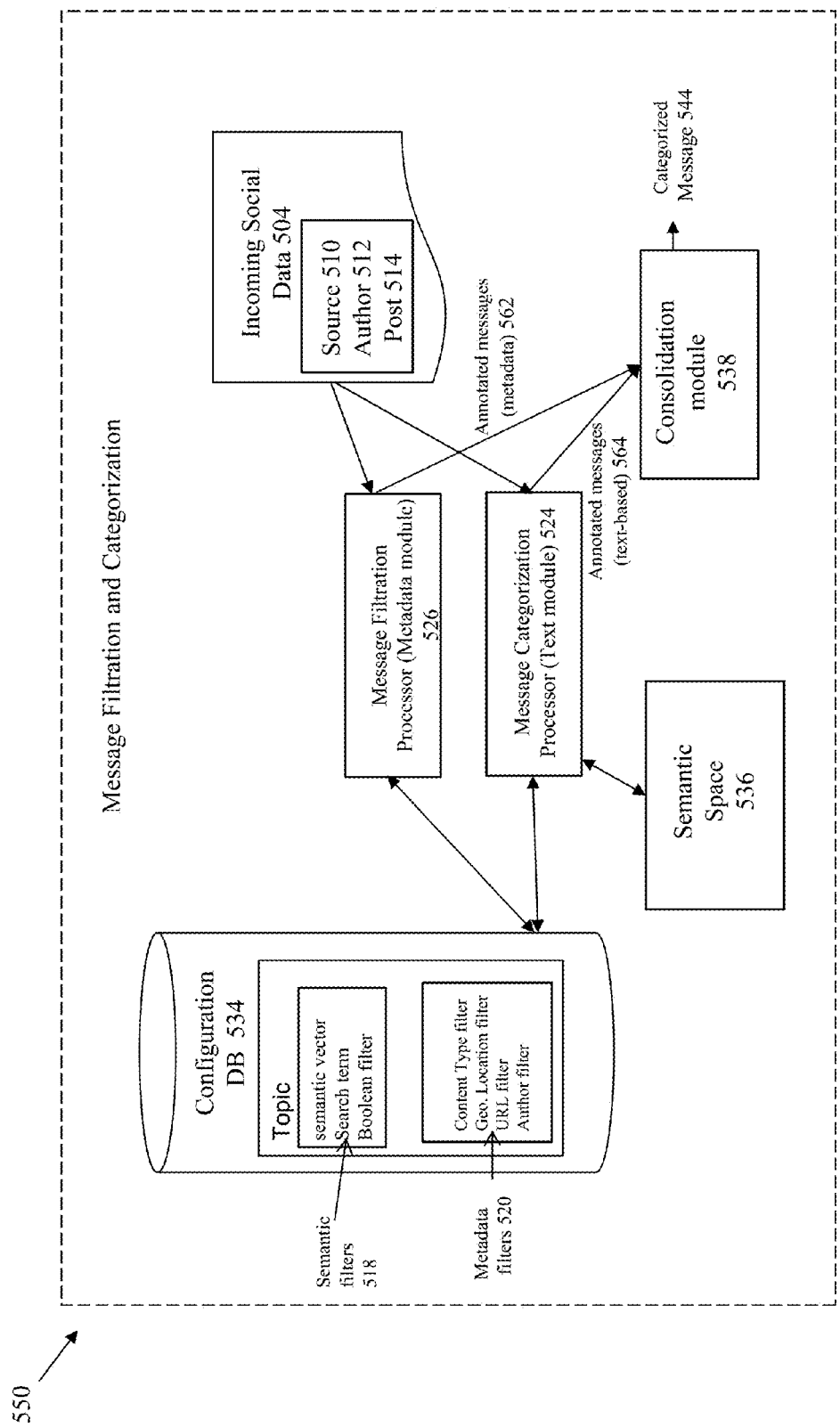
FIG. 5B illustrates another example embodiment for performing message categorization and filtration.

Referring now to FIG. 5B, another embodiment 550 of analyzing incoming data based on both metadata filters and text-based filters (e.g., semantic filters or topic vectors, keyword, Boolean, etc.) is provided. As shown in FIG. 5B, in some embodiments, both the message filtration processor 526, and the message categorizer processor 524 receive incoming social data from the plurality of data sources 504.

The message filtration processor 526 runs the set of metadata filters defined for a set of topic vectors against the incoming social data and annotates the incoming data based on whether the metadata criteria is satisfied or not. In one or more embodiments, each message may correspond to a message identifier. Similarly, each of the topics may correspond to a topic identifier, a metadata filter identifier and a text-based filter identifier.

The messages that fulfill one or more metadata filters may be annotated with identifiers of the particular metadata filter. This annotated data may be forwarded to a consolidation module 538.

The message categorizer may also receive incoming data directly from the plurality of data sources 504, as shown in FIG. 5B. Similarly messages that fulfill one or more text-based filters may be annotated with identifiers of the particular text-based filter, or topic vector ID. This annotated data may similarly be forwarded to the consolidation module 538.

In one or more embodiments, the consolidation module may be configured to consolidate all the analyzed data to see if the topic, as a whole has been fulfilled. The annotated messages from the filtration processor 526 and the annotated messages from the categorizer 524 may be associated based on the topic identifiers in the consolidation module. In one or more embodiments, the consolidation module uses the identifiers to ensure that only messages that are annotated for both the required metadata filters and the text-based filters are categorized for the topic. (544). Messages that fulfill a text-based filter, but do not fulfill the metadata criteria may not be forwarded. Thus, the message consolidator 538 utilizes the message IDs and topic IDs to appropriate categorize the annotated data received from both the metadata module (e.g., filtration processor) and the text-based module (e.g., message categorizer).

Figure 6B:
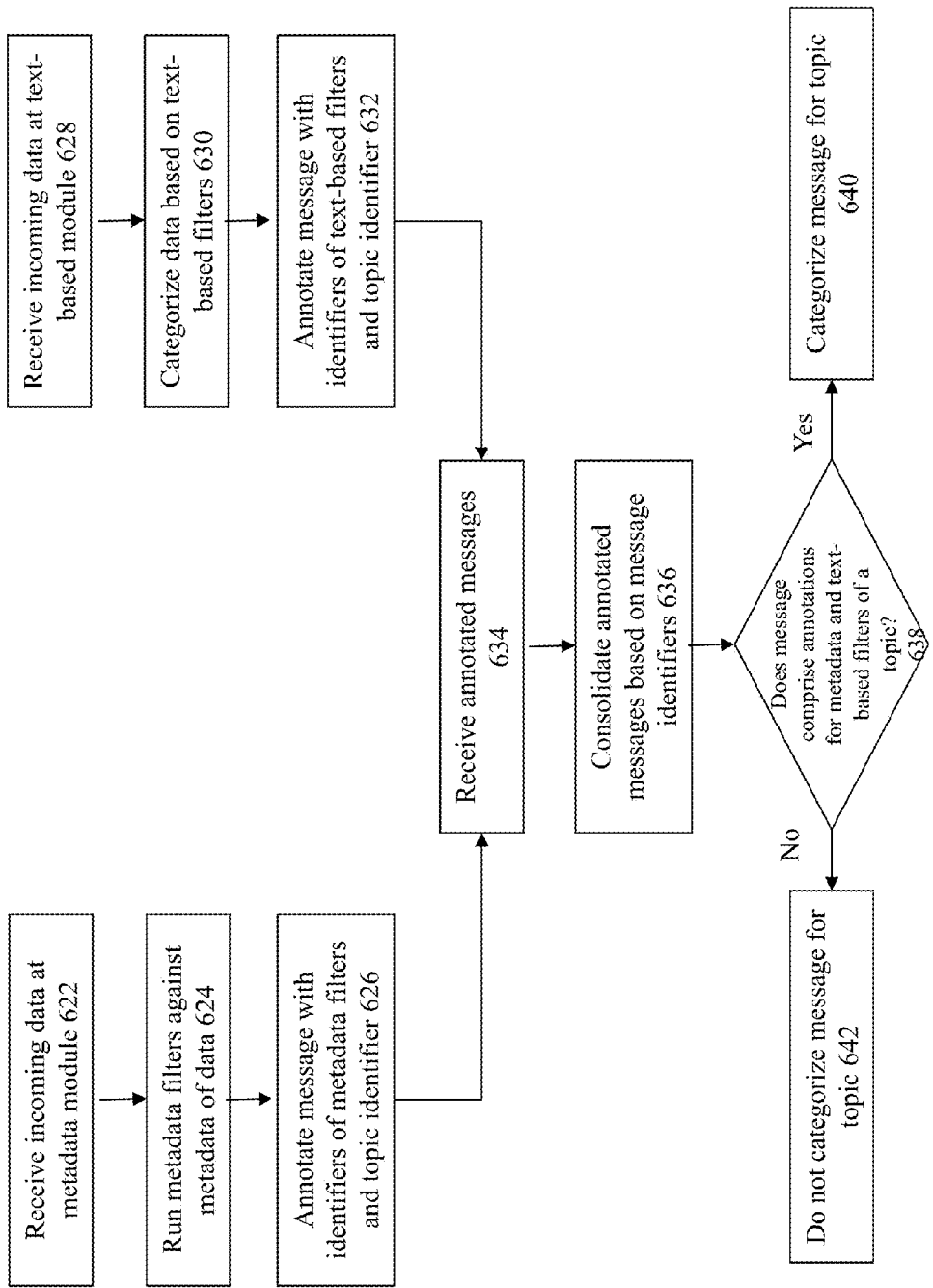
FIG. 6B illustrates a flowchart of an approach for performing message categorization and filtration using the architecture of FIG. 5B.

Referring now to FIG. 6B, FIG. 6B illustrates an example method of performing message categorization using the architecture of FIG. 5B. At 622, the metadata module may receive incoming data from a plurality of data sources. At 624, metadata filters for a plurality of topics are run against the metadata of the messages. If a metadata of a message fulfills metadata filters for one or more topics, the message (also having an identifier) may be annotated with identifiers associated with the topic and the metadata filters, at 626.

Similarly, at 628, the text-based module (e.g., message categorizer) may receive incoming data (e.g., content) from a plurality of data sources. At 630, the messages may be categorized based on the topic vectors. This refers to semantic analysis based on the set topic vectors, as well as any text-based filtering that is performed on the data. Message categorization typically involves vectorizing the messages (e.g., the content of the message) using a semantic space, and analyzing the vectorized messages against defined topic vectors. If the message is deemed to be close, the message may be annotated with the topic vector identifiers. Similarly, text-based filters may also be applied on the content of the message (e.g., messages containing a particular keyword, a Boolean operator etc.). The messages are annotated with all the relevant identifiers, at 632.

At 634, the annotated messages may be received at the message consolidation module. At 636, the message consolidation module may consolidate the annotated messages from the categorizer and the filtration module (e.g., text module and the metadata module) based on the identifiers of the message and the annotated IDs. At 638, it is determined whether the message comprises annotations for all the filters for the topic. If yes, the message is categorized for the topic at 640. If not, the message is not categorized for the topic (642).

Further details on message categorization are disclosed in U.S. patent application Ser. No. 14/815,692, filed on Jul. 31, 2015, entitled "METHOD AND SYSTEM FOR IMPLEMENTING SEMANTIC TECHNOLOGY," the contents of which are herein incorporated by reference for all purposes.

Figure 7:
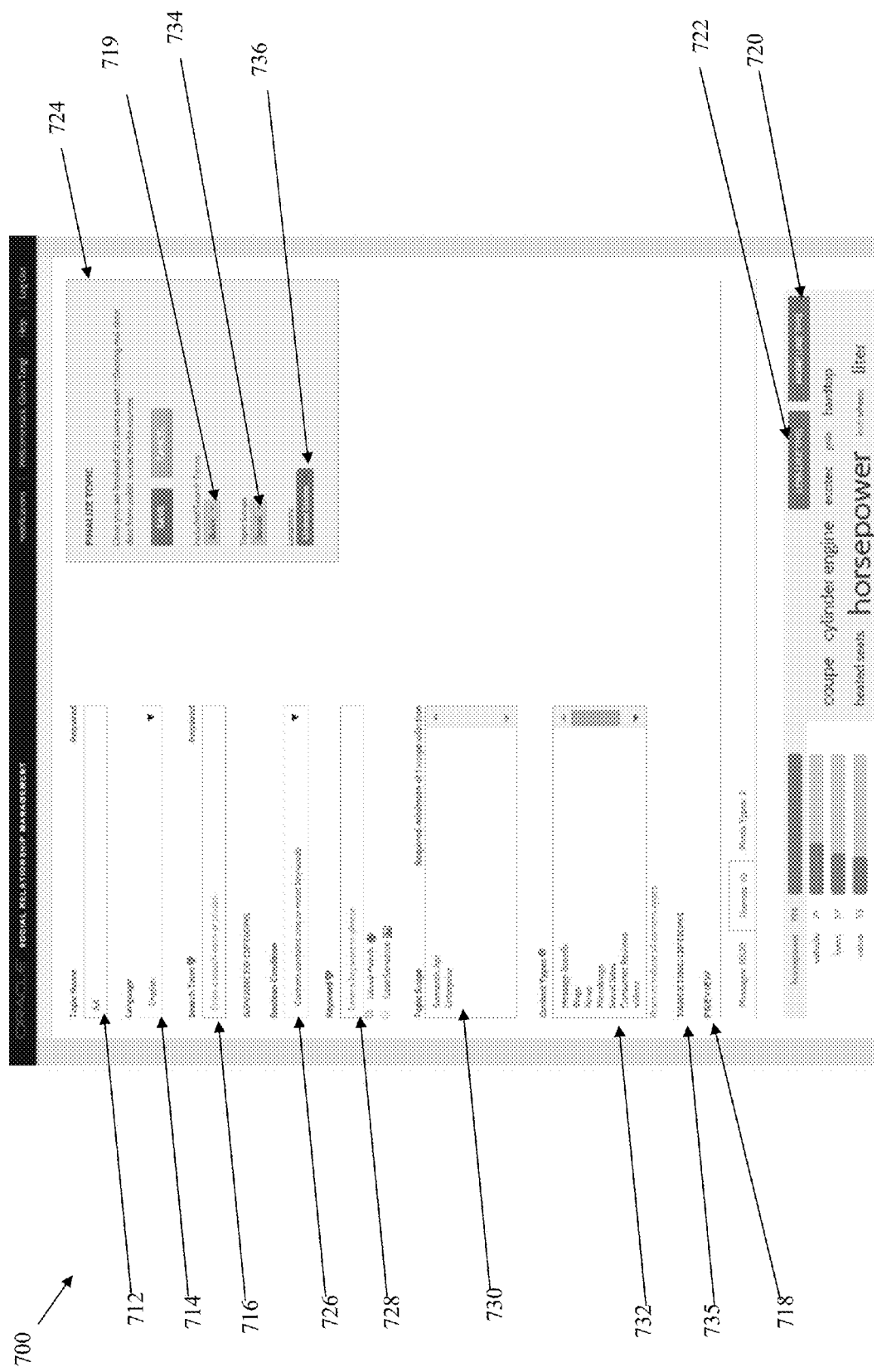
FIG. 7 shows an example interface for performing topic creation.

FIG. 7 illustrates an example interface 700 for performing topic creation, and applying various filters to the topic according to some embodiments of the invention. Each created topic filter is a collection of keyword, semantic and metadata filters that define the context and scope of the search. Keyword filters, Boolean filters and semantic filters (which correspond to a topic vector) may all be considered text-based filters. Field 712 is a portion of interface 10 that allows the user to provide an identifier for a new topic.

Field 714 permits the user to select one or more languages for which the search is to be performed. In the illustrated embodiment, the selected language is "English." Similarly other languages may be selected (e.g., Spanish, French, German, etc.). It should be appreciated that each of the languages may be associated with a separate database in which to perform the search.

Field 716 permits the user to provide one or more search terms that can be used as part of a continuous search for a matching set of results from one or more social media sources. While the topic creation process typically uses a sampling database to determine the scope and context of the topic search, as will be described below, it should be appreciated that after a topic has been created with the desired parameters, the system performs a continuous query on a stream of social media data such that the user essentially "listens" to the social media conversation over time, within the context and scope of the configured topic.

Based at least in part upon performing semantic analysis, themes are identified within the social data using the search term from field 714. Themes can be identified, for example, by performing semantic analysis and identifying semantic clusters within the analyzed data. The semantic clusters correspond to themes within the social media data. For example, latent semantic analysis (LSA), an advanced form of statistical language modeling, can be used to perform semantic analysis upon the content. This permits the system to understand the contextual and semantic significance of terms that appear within the social data. For example semantic analysis can be used to understand the difference between the term "Buick" used in the context of discussing vehicles, and "Buick" that is used to refer to the name of an estate.

Portion 718 of the interface 700 provides a listing of the themes identified from within the social data that pertain to the collection of one or more search terms. Each of the identified themes has a theme identifier, along with a numerical value identifying the number of messages/items that pertain to the search term. The listing of the themes can be presented as a sorted list, where the themes having the greatest relevance or the largest number of messages/items are placed at the top of the list.

Figure 8:
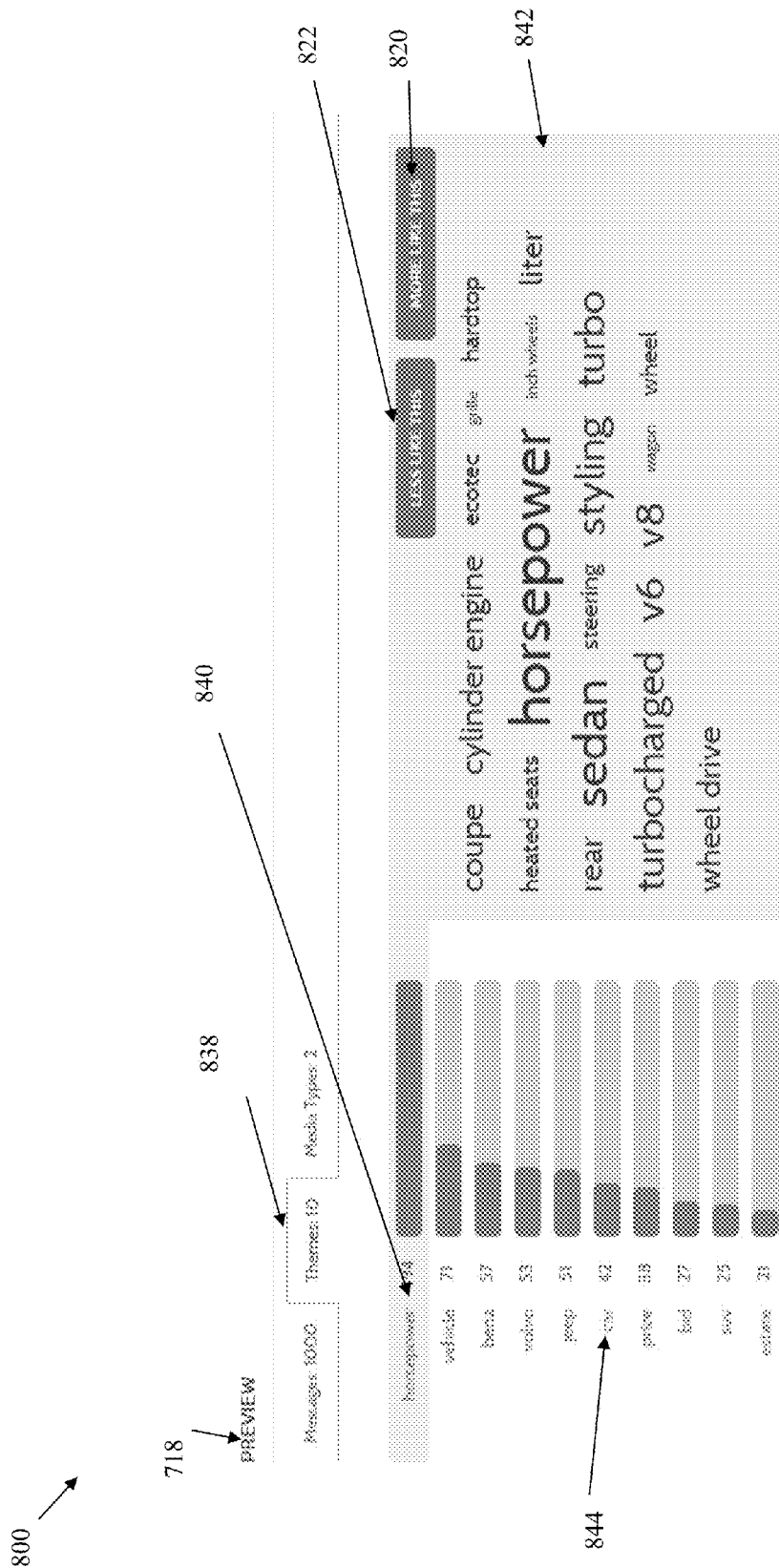
FIG. 8 shows an example interface for selecting themes according to some embodiments of the invention.

Referring ahead to FIG. 8, a closer view 800 of the interface portion 718 is illustrated. It should be appreciated that closer view 800 is simply the bottom portion of interface 800 that is reproduced again for illustrative purposes. In other embodiments, the closer view may be populated as a pop-up screen or an expandable portion of the interface 700. Here, in the illustrated embodiment, the "themes" tab 838 has been actuated to present the themes that have been identified based on the search terms. Similarly, the "messages" tab or "media types" tab may also be similarly actuated. In the illustrated embodiment, 10 themes have been identified, as displayed in the themes tab 838. Similarly, 1000 (or more) messages have been identified (not shown) and 2 media types have been identified (not shown). It should be appreciated that actuating the message tab or the media type tab displays more information on the identified messages or media types.

The themes tab 838 of the interface portion 718 permits a user to select a theme to review additional information about that theme. For example, portion 840 shows a highlighted theme, where selection of this theme by the user (e.g., by having the user move a mouse interface over these theme) causes portion 842 to display additional content/information/terms from messages/items that correspond to that theme. The user can review that displayed information to determine if that identified theme is really of interest to the user.

To explain, consider if themes are identified when the search term is "Buick". Assume that semantic analysis is performed such that multiple themes are identified pertaining to that search term. In particular, a first possible theme may pertain to the term "horsepower," a second possible theme may pertain vehicles at large, and a third possible theme may pertain to an estate, for example.

In this example, each of these themes would be identified in a list in portion 844 of the interface portion 718. Furthermore, each of these themes can be reviewed by selecting a given theme (e.g., as shown with the highlighting of portion 718). Once selected, portion 842 would display a sample of the terms/contexts associated with that theme. With the information displayed in portion 842, the user can decide which of the identified themes, if any, correspond to a topic of interest to the user.

Selection buttons 820 and 822 are provided to allow a user to indicate which of the themes are or are not pertinent to a topic of interest. Button 820 (e.g., a "More Like This" button) is used to identify a theme that is identifiable as pertinent to the topic of interest. In contrast, button 822 (e.g., a "Less Like This" button) is used to identify a theme that is identifiable as not being pertinent to the topic of interest.

Selection of button 820 will create a semantic filter that constrains the search process to identify and display themes that more correspond to the selected "More Like This" theme. Of course, this semantic filter may be considered a topic vector with a particular semantic significance. On the other hand, selection of button 822 will create a semantic filter that constrains the search process to eliminate from the search results any themes that correspond to the selected "Less Like This" theme. Application of a new semantic filter will cause a new search result to be produced and displayed in portion 844 of the interface.

Each time the user makes a new "More Like This" or "Less Like This" selection, the topic definition for the new topic is adjusted accordingly to include a new corresponding semantic filter.

Referring back to FIG. 7, once the user has defined semantic filters using buttons 822 and/or 820, interface portion 724 displays the current state of the topic definition parameters for the new topic. Interface sub-portion 719 identifies the search term(s) for the new topic. Here, in the illustrated embodiment, the included search term is "Buick." Similarly, multiple search terms may be similarly defined to further narrow or specific the topic of interest. If the user selected one or more semantic filters in interface portion 718 using buttons 820 and 822, interface portion 724 may also display the selected semantic filters as well (not shown) in another interface sub-portion.

Other tools may be similarly used for further defining the topic. Field 726 permits the user to enter Boolean conditions that may be used with respect to the search term 716. For example, as illustrated in exemplary embodiment of FIG. 7, the Boolean condition may require that the content contain one or more keywords. Field 728 may be similarly used to define the one or more keywords. For example, the user may want to create a topic using the exact phrase "Buick Star." Fields 726 and 728 may be used to define the condition.

In addition to applying semantic filters and other text-based filters (e.g., exact word, Boolean, etc.), various metadata filters may also be similarly selected through interface 700. Field 730 permits the user to select a topic scope. For example, the user may select the topic scope to be "enterprise," as shown in field 730 of FIG. 7. In one or more embodiments, the system may restrict the search to the enterprise associated with the user. For example, the data source, in this case may simply be enterprise data provided by the user's company. For example, if the user is part of an enterprise ABC, the search is limited to data pushed in from that enterprise database. Or, the selected topic scope may be "social," as shown in the interface sub-portion 734 of interface portion 724. Selecting the "social" parameter limits the scope of the search to social media. Thus, only social data from social media sites may be used to perform the desired search/topic creation/theme analysis.

Field 732 permits the user to select one or more content types from which to pull the social data. Again, like the topic scope field 730, field 732 is also a metadata filter that filters the social data based on the metadata rather than the content. For example, the user, when creating a topic, may only be interested in conversations pertaining to "Buick" in social data pulled from blogs. The user may then select the "Blog" content type using field 732 to listen to conversation about the search term in various blogs. Or, the user may only be interested in conversations pertaining to "Buick" within Consumer Reviews sites. To this end, the user may select the "consumer reviews" content type to limit the search to this type of metadata. The content type may be selected by using a mouse interface over the list of content types in field 732.

Additionally, other metadata filters may also be similarly defined to filter the social data based on the user's needs. In one embodiment, moving a mouse interface over interface portion 735 may create an expandable interface portion corresponding to targeting options.

Figure 9:
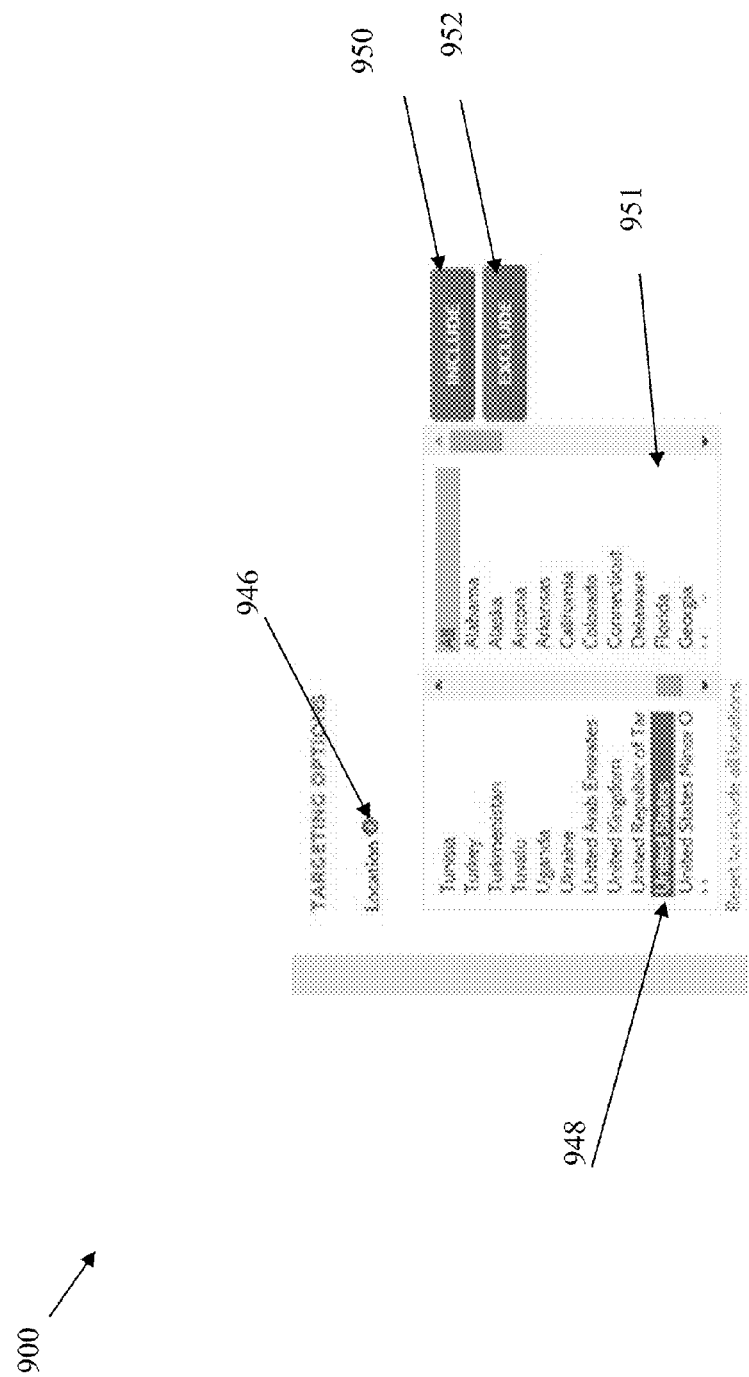
FIG. 9 shows an example interface for selecting a geographical location filter according to some embodiments of the invention.

In one embodiment, the user may define a geographical location metadata filter using the "Targeted Options" interface portion 735. Referring ahead to FIG. 9, a closer view 900 of interface portion 935 showing the geographical location filter 946 is illustrated. Although illustrated as an expandable menu in the current embodiment, it should be appreciated that the interface portion may be populated in any other manner (e.g., pop-up screen, a separate screen, etc.).

Interface portion 946 of FIG. 9 allows the user to select one or more geographical locations based on which the social data may be filtered. For example, the user may only be interested in conversations originating from users in the United States. Field 948 displays a list of locations, out of which the user may select one or more locations using a mouse interface. In the illustrated embodiment, "United States" has been actuated. Once the country has been selected, field 951 is populated which displays a list of states of the selected country. The user may select one or more states using a mouse interface, or may simply select "All," if social data from all states is desired. Selection buttons 950 and 952 are provided to allow the user to indicate which locations are of interest to the user. Button 950 "e.g., "Include" button" is used to identify one or more locations of interest. In contrast, button 952 (e.g., "Exclude" button) is used to identify locations to be specifically excluded. It should be appreciated that although the exemplary illustrated embodiment of FIG. 9 only shows country and states, other embodiments may allow the user to select location with further granularity. For example, the user may be able to include (or exclude a particular city of interest. Or, in other embodiments, the user may even be able to include or exclude locations based on zip codes, GPS location of the user, and other such parameters.

Referring back to FIG. 7, once the geographical location filter has been defined using interface portion 735, the selected location is shown is interface sub-portion 736 of interface portion 724, which displays the current state of the topic definition parameters of the topic, as described previously.

Figure 10:
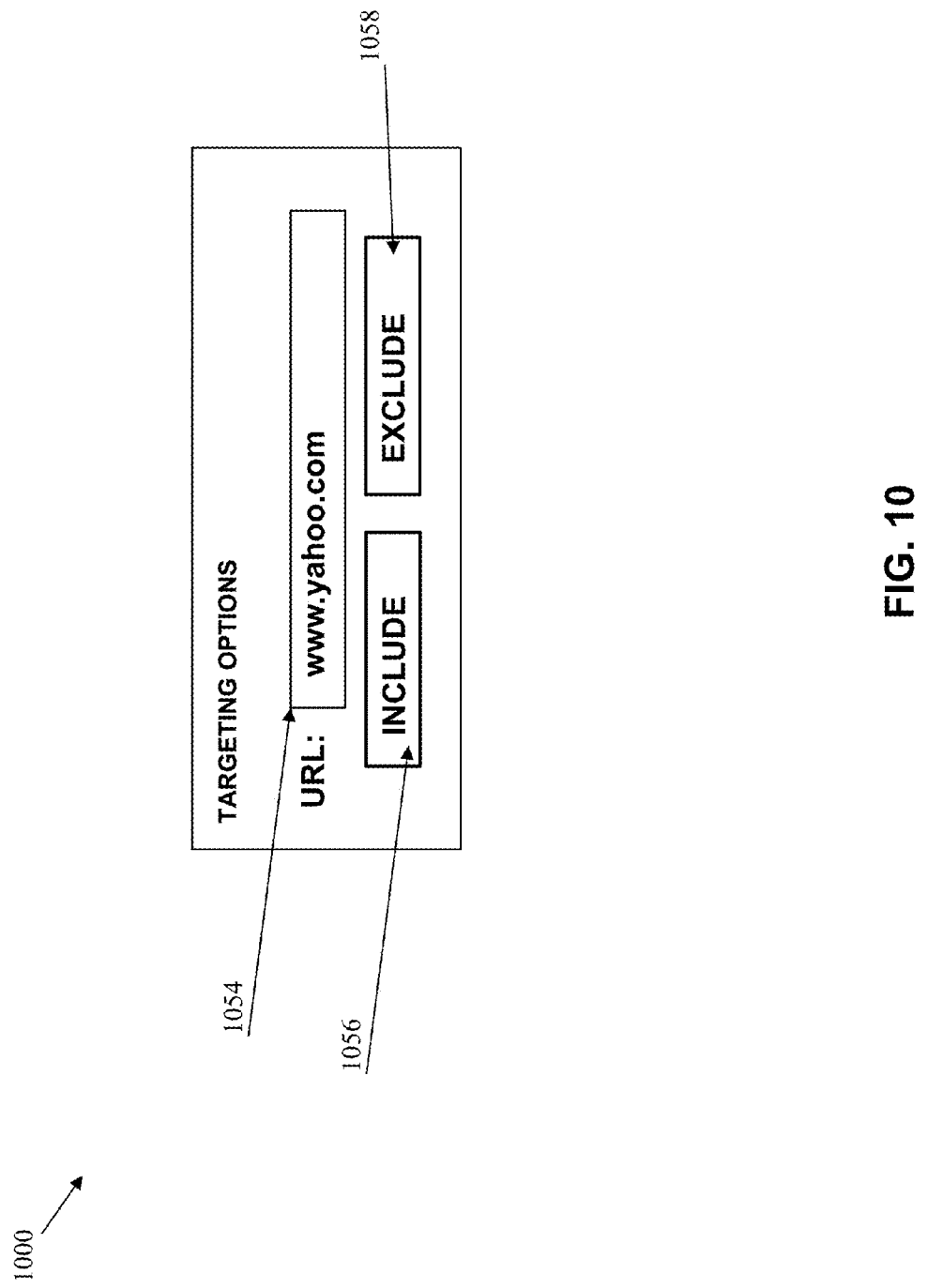
FIG. 10 shows an example interface for selecting a URL based metadata filter according to some embodiments of the invention.

The "Targeted Options" interface portion 735 may also allow the user to select a URL-based metadata filter. The URL-based metadata filter filters the social data based on the URL of the social data. For example, the user may simply be interested in social data originating from a particular website. Referring ahead to FIG. 10, a closer view 1000 of interface portion 735 showing the URL metadata filter is illustrated.

Field 1054 of the interface portion 735 permits a user to enter a URL address. For example, the user may be interested in limiting the search terms to social data from the Yahoo® website. To this end, field 1054 may be used to specify the URL address. Selection buttons 1056 and 1058 are provided to allow the user to identify the URLs of interest. Button 1056 (e.g., "Include" button) is used to include the URL entered in field 1054. In contrast, button 1058 (e.g., "Exclude" button) is used to exclude the URL entered in field 1054. The user may select one or more URL-based metadata filters using the field 1054. Once the URL-based metadata filter has been identified using the targeting options portion 735, the URL-based parameter is populated along with the remaining parameters in interface portion 724 (not shown).

Referring back to FIG. 7, the "Targeted Options" interface portion 735 may also allow the user to select an author-based metadata filter. The user may apply an author-based metadata filter to the topic such that all social data originating from a particular author is included or excluded.

Figure 11:
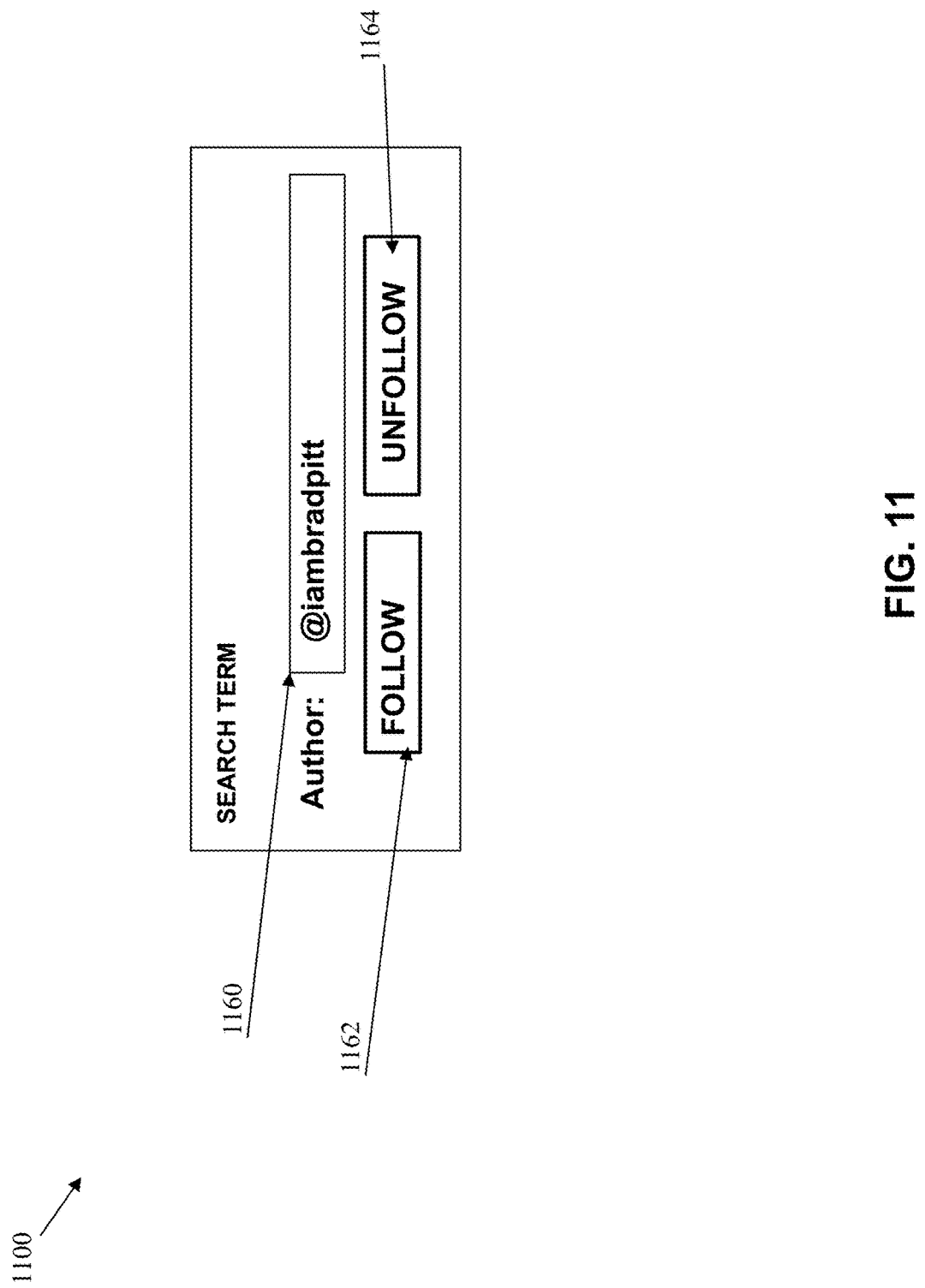
FIG. 11 shows an example interface for selecting an author-based metadata filter according to some embodiments of the invention.

Referring now to FIG. 11, another type of metadata filter is illustrated. It should be appreciated that in other embodiments, this metadata filter may be identified as part of the search term field 716 rather than through the "Targeting Options" interface portion 735. When creating a topic, the user may apply an author-based metadata filter to the topic such that all social data originating from a particular author is pulled. In other words, the user may simply want to "follow" one or more authors of interest. For example, the user may be interested in "listening" to all conversations originating from a particular Twitter® handle (e.g., all tweets from Brad Pitt) for example. Field 1160 permits a user to enter in an author name, a Twitter® handle identifier, a Tumblr® account identifier, etc. to identify the author the user wants to follow. In the illustrated embodiment, the Twitter® handle "iambradpitt" has been entered into field 1160.

Selection buttons 1162 and 1164 are provided to allow the user to identify the authors of interest. Button 1162 (e.g., "Follow" button) is used to include the author entered in field 1160. In contrast, button 1164 (e.g., "Unfollow" button) is used to exclude the author entered in field 1164. The user may select one or more authors to follow using the field 1160. Once the author-based metadata filter has been identified, it is populated along with the remaining parameters in interface portion 724 (not shown) of FIG. 7.

The user may undergo multiple iterations of the process to view search results, where the search results are adjusted by selecting one or more themes for which a semantic filter is to be created. After some period of time, the application of the appropriate semantic filters should provide an acceptable definition of a new topic which addresses the subject matter of interest to the user, while filtering out subject matter that do not pertain to the subject matter of interest. This can be accomplished, for example, when the combination of the selected filters causes all and/or most of the themes identified in interface portion 716 to generally correspond to the subject matter of interest. At that point, the topic definition can be saved to create the new topic.

Figure 12:
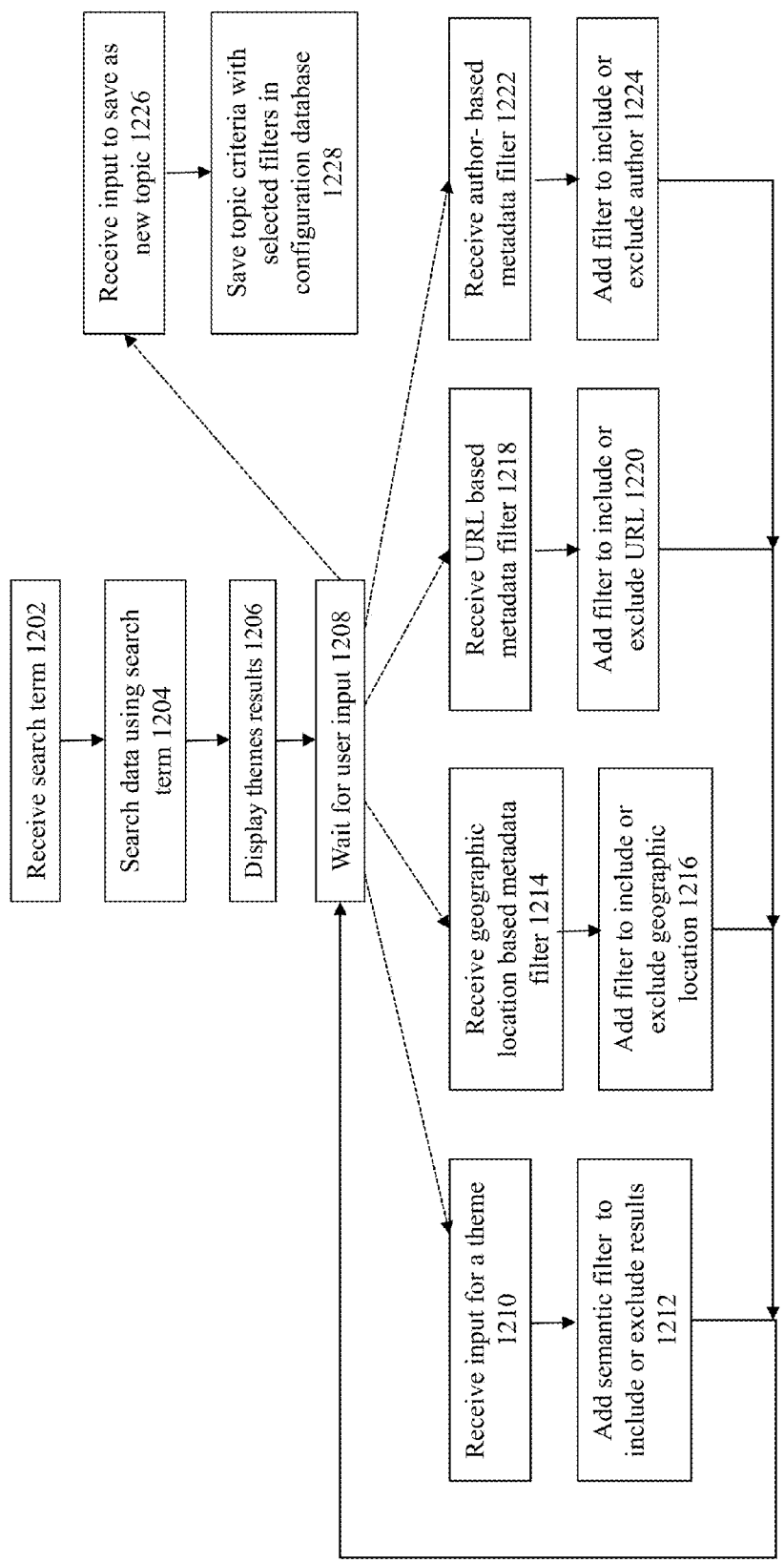
FIG. 12 illustrates a flowchart of an approach for creating a topic based on filters.

FIG. 12 shows a flowchart of a process to create a new topic with one or more filters using a user interface, e.g., as shown in FIG. 7. The process may include a keyword search using a search term, performing semantic analysis to identify one or more themes, and addition of further semantic and metadata filters. The semantic analysis can be used to disambiguate the search terms/keywords from the search results, e.g., for themes that are not of interest to the user but may otherwise match by keyword.

At 1202, one or more search terms are received from the user. In one embodiment, all the additional filters are received at the same time, without performing the semantic analysis and a new topic may simply be saved without selecting themes. For illustrative purposes, it will be assumed that semantic analysis is first performed before adding additional filters, but it should be appreciated that other embodiments may create a topic based on a set of metadata filters, for example.

At 1204, the collected social data is searched using the search term. In one embodiment, an exact keyword match is performed at 1204. Alternatively, variants of the search term can be applied to generate search results.

At 1206, semantic analysis is performed to identify a set of themes to the user. In some embodiments, latent semantic analysis is performed to identify the themes. A sorted listing of the themes may be presented to the user in the user interface. Controls are also provided to the user to permit selection of one or more themes to establish a new semantic filter for the topic.

At 1208, the interface waits for new user inputs. For example, at 1210, the user interface may receive an input for a theme (e.g., the user may select the "more like this" button to include more results like a selected theme, the user may select the "less like this" button to exclude results like a selected theme). At 1212, based on the received input, a new semantic filter is added to include or exclude the selected theme(s). As described previously, the selected filters are typically displayed in a preview portion of the interface as shown in FIG. 7. Typically, the new semantic filter will cause a new search to be performed over the sample corpus (e.g., refer to 338 in FIG. 3), with the updated search results presented to the user in the user interface. The user may undergo multiple iterations of the above steps to add (and/or remove) the semantic filters, where application of the semantic filters should provide a listing of themes shown in the user interface to generally correspond to the subject matter of interest to the user.

At 1214, the user interface may receive input about a geographic location based metadata filter. In one embodiment, a listing of available geographical locations may be presented to the user in the user interface. Controls are also provided to the user to permit selection of one or more geographic locations establish a new metadata filter for the topic.

For example, the user may select one or more geographical locations from the list, and choose to "include" or "exclude" search results originating from that geographical location (e.g., by using the "include" or "exclude" controls at the user interface, as shown in FIG. 10). At 1216, a new metadata filter is added to include or exclude the selected geographical location. As described previously, the selected filters are typically displayed in a preview portion of the interface as shown in FIG. 7. In one or more embodiments, a new search may be performed over the sample corpus, with the updated search results presented to the user in the user interface.

At 1218, the user interface may receive input about a URL based metadata filter. In one embodiment, an entry box permitting the user to enter in a URL may be presented to the user in the user interface. Controls are also provided to the user to either include or exclude search result originating from the entered URL, as described above.

For example, the user may enter in a particular URL address, and choose to "include" or "exclude" search results originating from that URL (e.g., by using the "include" or "exclude" controls at the user interface, as shown in FIG. 11). At 1220, a new metadata filter is added to include or exclude search results originating from the desired URL. As described previously, the selected filters are typically displayed in a preview portion of the interface as shown in FIG. 7. Typically, the new metadata filter will cause a new search to be performed over the data, with the updated search results presented to the user in the user interface.

At 1222, the user interface may receive input about an author based metadata filter. In one embodiment, an entry box permitting the user to enter in an author of interest (e.g., author page, Twitter® handle, etc.) may be presented to the user in the user interface such that the user may follow or unfollow a particular author. Controls are also provided to the user to either include or exclude search result created by the author, as described above.

For example, the user may enter in a particular author name or author identifier (e.g., Twitter® handle, etc.), and choose to "follow" that particular author. At 1224, a new metadata filter is added to include or exclude search results created by the author. As described previously, the selected filters are typically displayed in a preview portion of the interface as shown in FIG. 7. Typically, the new metadata filter will cause a new search to be performed over the data, with the updated search results presented to the user in the user interface. It should be appreciated that in other embodiments, the search term 1202 itself is simply a particular author's handle that the user may simply "follow," as described above.

Although the process illustrated in FIG. 12 only describes the semantic filter, the geographic location metadata filter, the URL metadata filter and the author-based metadata filter, other filters (e.g., content type metadata filter, Boolean filter, keyword filter) may also be similar applied (not shown).

The process of adding text-based and metadata filters may go through multiple iterations until the user is satisfied with the current definition of the new topic. It should be appreciated that a search (during topic creation) is performed on a sample corpus of data (e.g., 338 in FIG. 3) to enable the user to get a sense of the type of data that is typical for the set filters. This may allow the user to tailor the search if needed, based on the sample search. Of course, once the topic has been defined with appropriate semantic and metadata filters, incoming data from a variety of sources may be analyzed based on the created topic parameters.

Once the user is satisfied with the current definition of the new topic, then at 1226, the user may provide an input to the user interface to save the new topic. At this point, the topic parameters (e.g., search term(s), semantic filter(s) and metadata filter(s)) should include an acceptable definition of a new topic which addresses the subject matter of interest to the user, while filtering out subject matter that does not pertain to the subject matter of interest. At that point, at 1228, the topic definition can be saved in a configuration database to create the new topic.

Figure 13:
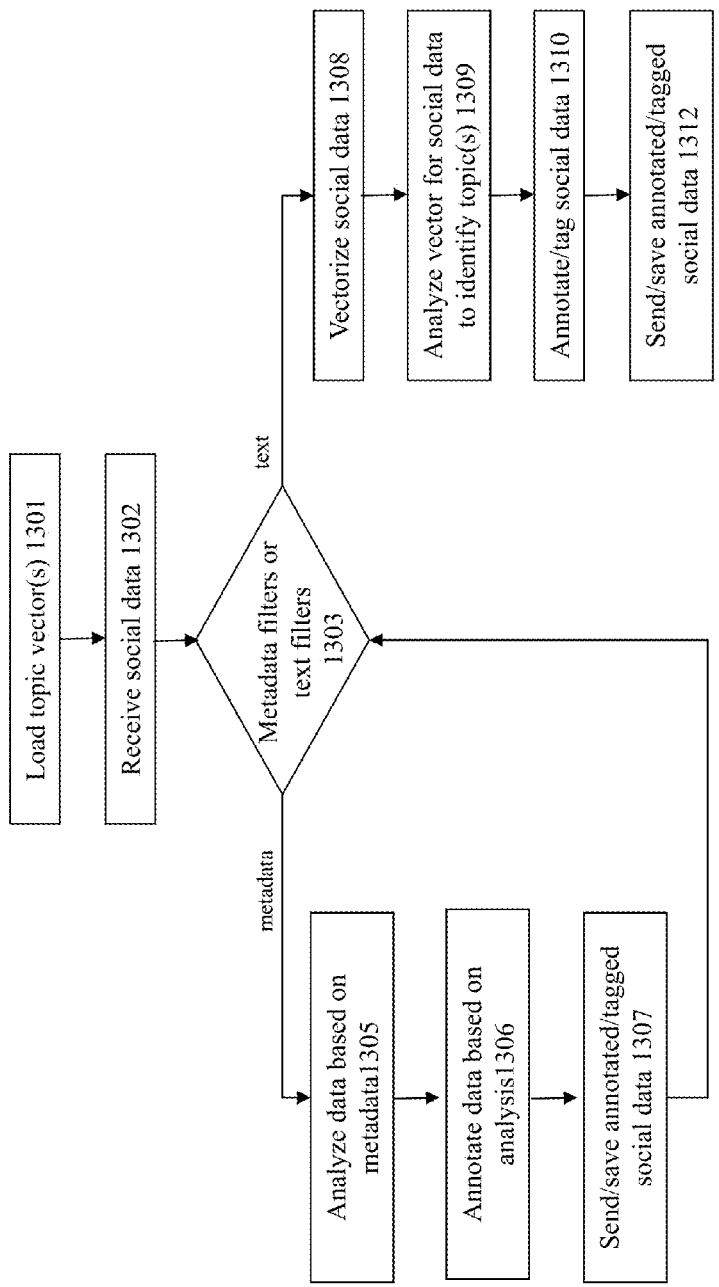
FIG. 13 shows a flowchart of an approach to perform message categorization based on metadata and text-based filters.

FIG. 13 illustrates a flowchart of an approach for performing message categorization using the architecture of FIGS. 5A and 5B. At 1301, message categorization processor 524 (or filtration processor 526) loads topic vectors (including both metadata and text-based filters) from the configuration database 534 for any created topics. In a commercial setting, these topic vectors pertain, for example, to any topics/dimensions set up by a user for a given brand and/or product. In this context, the topics comprise a given brand or product name. The dimensions may pertain to consumer intent, interest, or psychographics.

At 1302, an item of social media content (e.g., a message) is received by the message categorization processor 524/526. As discussed above, each item of social media content may have both a text component and a metadata content. The social data may be divided into a text component of the social data and a metadata component of the social data. At 1303, a determination is made whether there are metadata filters and/or text filters for the loaded topic.

If there are metadata filters, at 1305, the message may be analyzed based on the metadata filters. For example, the metadata criteria defined in the metadata filter may be compared to the metadata of the message. At 1306, any metadata that is identified as being associated with a given metadata filter can be annotated and/or tagged to indicate the association. Thereafter, at 1307, the annotated/tagged message exits the message processor 524/526 to a downstream location. In one or more embodiments, the data may be forwarded such that the text of the message may be analyzed to see if it may be categorized based on the text-based filters (e.g., topic vectors, semantic filters, Boolean search, etc.) set for the topic. For example, the data may be forwarded to the semantic module of the message categorizer. Or, the data may be forwarded to the message categorizer from the filtration module, as shown in FIG. 5. Of course, as discussed above, in some embodiments, the text-based filters may be applied prior to analyzing the data against metadata filters. In yet another embodiment, analysis based on metadata and text may be performed separately, and the annotated data may be reconciled through another module that consolidates analyzed data from the metadata module (e.g., the filtration module) and the semantic module (e.g., the message categorizer module).

At 1303, a determination is made that the loaded topic comprises semantic filters or topic vectors. At 1308, the message content of the data may be vectorized. The semantic space 536 may be accessed to vectorize the text to create a text vector for the message.

At 1309, the text vector is analyzed relative to the topic vector(s), in this case the text filters (e.g., topic vectors, etc.). This is performed, for example, by calculating the cosine of the text vector against each text filter vector. The similarity of the metadata vector to the text filter vector is computed by calculating this cosine value, to check for one of the following:

Identical meaning: value of cosine=1
Unrelated meaning: value of cosine=0
Opposite meaning: value of cosine=−1
A threshold distance to any of the above values A text that relates to one of the created filters would correspond exactly or generally to the appropriate cosine value from performing the calculations. One or more thresholds can be configured for the cosine values to check whether or not the text matches to the topic vector. It should be appreciated that the above reflects the analysis performed for semantic filters or topic vectors. Other text-based analysis (e.g., keyword, Boolean, etc.) may be performed using conventional search techniques. For example, only data including a particular keyword may be included in the categorized messages. Or, in another example, AND/OR operators may be applied. Similarly, other known search techniques may be applied to the text.

At 1310, any text that is identified as being associated with a given text filter can be annotated and/or tagged to indicate the association. Thereafter, at 1311, the annotated/tagged message exits the message processor 524 to a downstream location.

Therefore, what has been described is a system, method, and computer program product for allowing an entity to access data from a plurality of sources, and to perform semantic analysis upon that data to identify and create topics with regards to that data. The invention is capable of accessing data across multiple types of internet-based sources of social data and commentary.

A user interface is provided that allows the user to view and interact with to view and control the process/mechanism or creating topics with the additional capability of defining text based and metadata based filters.

The topic creation process can be used for numerous advantageous purposes. For example, the created topics can be used to identify content from various data sources that pertain to the created topic. This is useful, for example, to identify user themes are emerge from the social data an which can be used to "bucketize" conversations around the created topic.

System Architecture Overview

Figure 14:
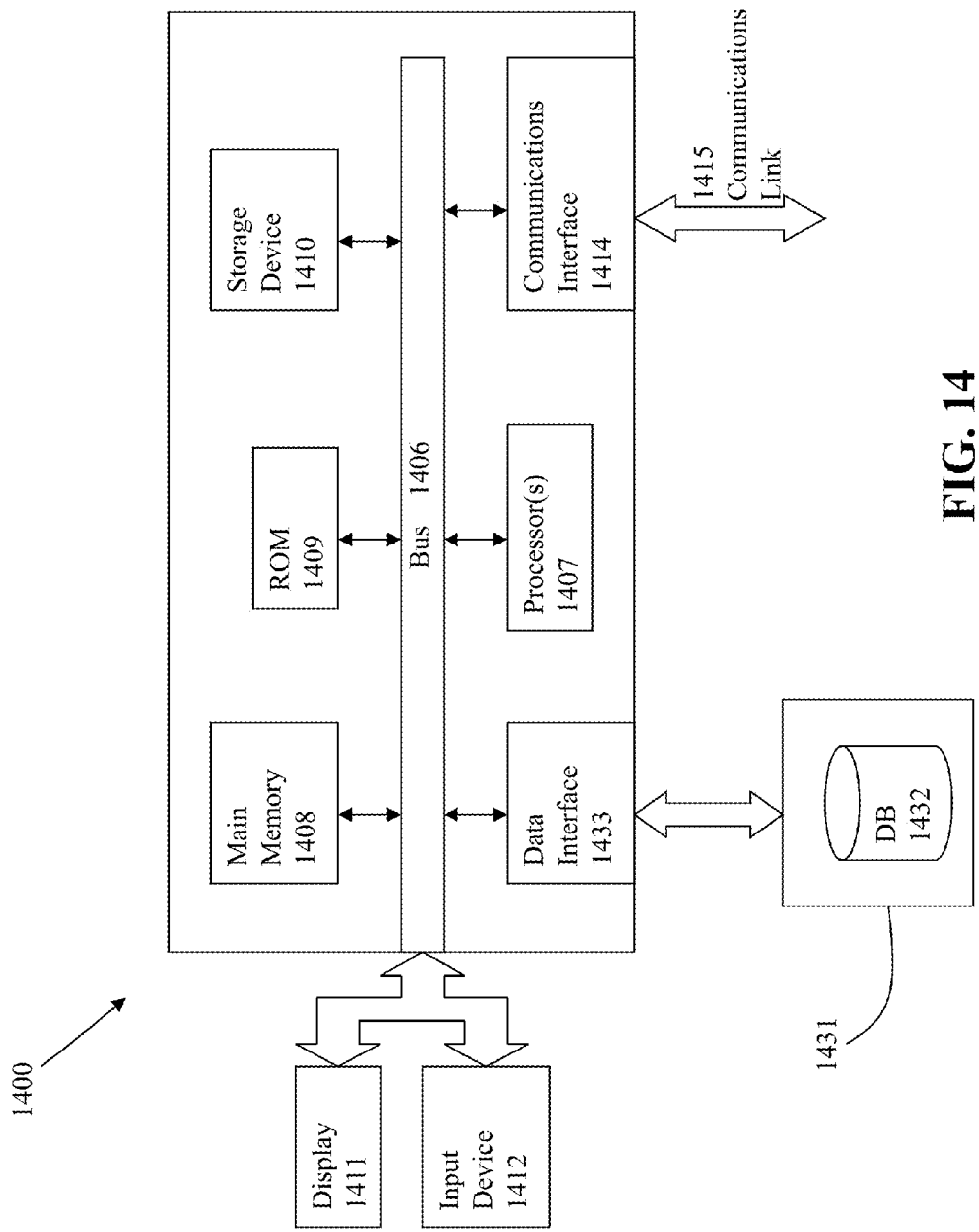
FIG. 14 depicts a computerized system on which an embodiment of the invention can be implemented.

FIG. 14 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method comprising:
  generating a graphical user interface for defining a semantic analysis topic;
  receiving, via the graphical user interface, one or more first user inputs indicating a search term;
  generating, based on the search term and a sample corpus of data, a plurality of content themes, wherein generating the plurality of content themes comprises accessing a semantic space to perform semantic analysis on the sample corpus of data;
  presenting the plurality of content themes in the graphical user interface;

receiving, via the graphical user interface, one or more second user inputs indicating that a first content theme in the plurality of content themes is not pertinent to the semantic analysis topic;

generating, based at least on the one or more second user inputs, a semantic filter to include in the semantic analysis topic,
- wherein the semantic filter matches messages corresponding to a second content theme, in the plurality of content themes, that is pertinent to the semantic analysis topic, and
- wherein the semantic filter does not match messages corresponding to the first content theme that is not pertinent to the semantic analysis topic;

receiving a plurality of messages; and categorizing the plurality of messages at least by applying the semantic analysis topic to the plurality of messages, wherein applying the semantic analysis topic to the plurality of messages comprises applying the semantic filter to the plurality of messages, wherein applying the semantic filter to the plurality of messages comprises, for a message in the plurality of messages:
- vectorizing the message to obtain a vectorized message;
- analyzing the vectorized message against a topic vector corresponding to the semantic filter; and
- annotating the message, based at least in part on analyzing the vectorized message against the topic vector, wherein the method is performed by one or more devices comprising one or more hardware processors.

2. The method of claim 1, further comprising:
receiving, via the graphical user interface, one or more third user inputs indicating that the second content theme is pertinent to the semantic analysis topic.

3. The method of claim 1, wherein applying the semantic analysis topic to the plurality of messages further comprises applying a keyword search to each message in the plurality of messages.

4. The method of claim 1, wherein applying the semantic analysis topic to the plurality of messages further comprises applying a metadata filter to each message in the plurality of messages.

5. The method of claim 4, wherein the metadata filter is based on one or more geographical locations indicated by metadata in the plurality of messages.

6. The method of claim 4, wherein the metadata filter is based on one or more content types indicated by metadata in the plurality of messages.

7. The method of claim 4, wherein the metadata filter is based on one or more uniform resource locators (URL's) indicated by metadata in the plurality of messages.

8. The method of claim 4, wherein the metadata filter is based on one or more message authors indicated by metadata in the plurality of messages.

9. A non-transitory computer readable medium comprising instructions which, when executed by one or more hardware processors, cause performance of operations comprising:
generating a graphical user interface for defining a semantic analysis topic;
receiving, via the graphical user interface, one or more first user inputs indicating a search term;
generating, based on the search term and a sample corpus of data, a plurality of content themes, wherein generating the plurality of content themes comprises accessing a semantic space to perform semantic analysis on the sample corpus of data;
presenting the plurality of content themes in the graphical user interface;
receiving, via the graphical user interface, one or more second user inputs indicating that a first content theme in the plurality of content themes is not pertinent to the semantic analysis topic;
generating, based at least on the one or more second user inputs, a semantic filter to include in the semantic analysis topic,
- wherein the semantic filter matches messages corresponding to a second content theme, in the plurality of content themes, that is pertinent to the semantic analysis topic, and
- wherein the semantic filter does not match messages corresponding to the first content theme that is not pertinent to the semantic analysis topic;

receiving a plurality of messages; and categorizing the plurality of messages at least by applying the semantic analysis topic to the plurality of messages, wherein applying the semantic analysis topic to the plurality of messages comprises applying the semantic filter to the plurality of messages, wherein applying the semantic filter to the plurality of messages comprises, for a message in the plurality of messages:
- vectorizing the message to obtain a vectorized message;
- analyzing the vectorized message against a topic vector corresponding to the semantic filter; and
- annotating the message, based at least in part on analyzing the vectorized message against the topic vector.

10. The non-transitory computer readable medium of claim 9, the operations further comprising:
receiving, via the graphical user interface, one or more third user inputs indicating that the second content theme is pertinent to the semantic analysis topic.

11. The non-transitory computer readable medium of claim 9, wherein applying the semantic analysis topic to the plurality of messages further comprises applying a keyword search to each message in the plurality of messages.

12. The non-transitory computer readable medium of claim 9, wherein applying the semantic analysis topic to the plurality of messages further comprises applying a metadata filter to each message in the plurality of messages.

13. The non-transitory computer readable medium of claim 12, wherein the metadata filter is based on one or more geographical locations indicated by metadata in the plurality of messages.

14. The non-transitory computer readable medium of claim 12, wherein the metadata filter is based on one or more content types indicated by metadata in the plurality of messages.

15. The non-transitory computer readable medium of claim 12, wherein the metadata filter is based on one or more uniform resource locators (URL's) indicated by metadata in the plurality of messages.

16. The non-transitory computer readable medium of claim 12, wherein the metadata filter is based on one or more message authors indicated by metadata in the plurality of messages.

17. A system comprising:
one or more hardware processors; and one or more one or more non-transitory computer-readable media storing instructions, which when executed by the one or more hardware processors, cause execution of operations comprising:

generating a graphical user interface for defining a semantic analysis topic;

receiving, via the graphical user interface, one or more first user inputs indicating a search term;

generating, based on the search term and a sample corpus of data, a plurality of content themes, wherein generating the plurality of content themes comprises accessing a semantic space to perform semantic analysis on the sample corpus of data;

presenting the plurality of content themes in the graphical user interface;

receiving, via the graphical user interface, one or more second user inputs indicating that a first content theme in the plurality of content themes is not pertinent to the semantic analysis topic;

generating, based at least on the one or more second user inputs, a semantic filter to include in the semantic analysis topic,
  wherein the semantic filter matches messages corresponding to a second content theme, in the plurality of content themes, that is pertinent to the semantic analysis topic, and
  wherein the semantic filter does not match messages corresponding to the first content theme that is not pertinent to the semantic analysis topic;

receiving a plurality of messages; and categorizing the plurality of messages at least by applying the semantic analysis topic to the plurality of messages, wherein applying the semantic analysis topic to the plurality of messages comprises applying the semantic filter to the plurality of messages, wherein applying the semantic filter to the plurality of messages comprises, for a message in the plurality of messages:
  vectorizing the message to obtain a vectorized message;
  analyzing the vectorized message against a topic vector corresponding to the semantic filter; and
  annotating the message, based at least in part on analyzing the vectorized message against the topic vector.

18. The system of claim 17, the operations further comprising:
  receiving, via the graphical user interface, one or more third user inputs indicating that the second content theme is pertinent to the semantic analysis topic.

19. The system of claim 17, wherein applying the semantic analysis topic to the plurality of messages further comprises applying a keyword search to each message in the plurality of messages.

20. The system of claim 17, wherein applying the semantic analysis topic to the plurality of messages further comprises applying a metadata filter to each message in the plurality of messages.

21. The system of claim 20, wherein the metadata filter is based on one or more geographical locations indicated by metadata in the plurality of messages.

22. The system of claim 20, wherein the metadata filter is based on one or more content types indicated by metadata in the plurality of messages.

23. The system of claim 20, wherein the metadata filter is based on one or more uniform resource locators (URL's) indicated by metadata in the plurality of messages.

24. The system of claim 20, wherein the metadata filter is based on one or more message authors indicated by metadata in the plurality of messages.

* * * * *

UNITED STATES PATENT AND TRADEMARK OFFICE
CERTIFICATE OF CORRECTION

PATENT NO. : 10,146,878 B2
APPLICATION NO. : 14/863690
DATED : December 4, 2018
INVENTOR(S) : Tang et al.

Page 1 of 1

It is certified that error appears in the above-identified patent and that said Letters Patent is hereby corrected as shown below:

In the Specification

In Column 1, Line 10, delete "CREATION."." and insert -- CREATION". --, therefor.

In Column 4, Line 40, delete "provided" and insert -- provide --, therefor.

In Column 7, Line 2, after "etc.)" insert -- . --.

In Column 9, Line 26, delete "PTSN," and insert -- PSTN, --, therefor.

In Column 24, Line 33, delete "PTSN," and insert -- PSTN, --, therefor.

Signed and Sealed this
Seventeenth Day of December, 2019

Andrei Iancu
*Director of the United States Patent and Trademark Office*